June 2, 1964   S. M. BRAININ ETAL   3,135,955
SEARCH CONTROLLER
Filed Feb. 15, 1960   14 Sheets-Sheet 1

*INVENTORS*
SAMUEL M. BRAININ
FRANK VYZRALEK JR.
BY
ATTORNEY

INVENTORS
SAMUEL M. BRAININ
FRANK VYZRALEK JR.
BY
ATTORNEY

INVENTORS
SAMUEL M. BRAININ
FRANK VYZRALEK JR.

ATTORNEY

June 2, 1964

S. M. BRAININ ETAL 3,135,955

SEARCH CONTROLLER

Filed Feb. 15, 1960

INVENTORS
SAMUEL M. BRAININ
FRANK VYZRALEK JR.

BY

ATTORNEY

June 2, 1964

S. M. BRAININ ETAL 3,135,955

SEARCH CONTROLLER

Filed Feb. 15, 1960

*INVENTORS*
SAMUEL M. BRAININ
FRANK VYZRALEK JR.
BY

ATTORNEY

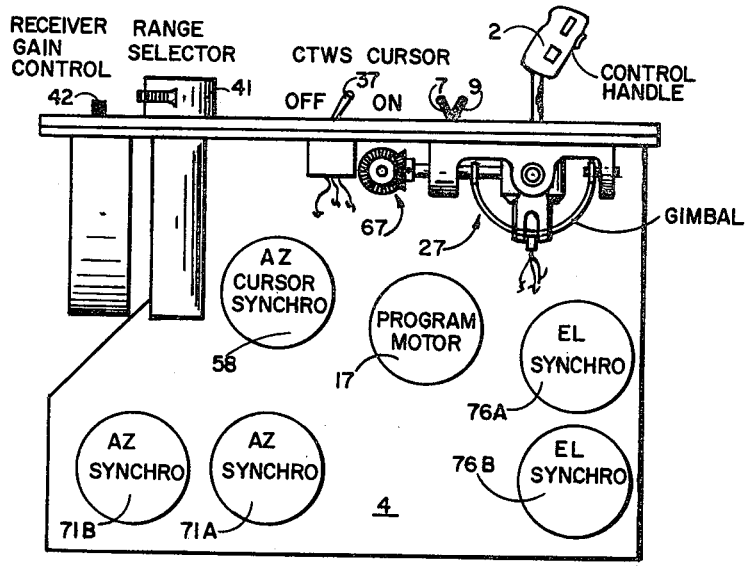
FIG. 10
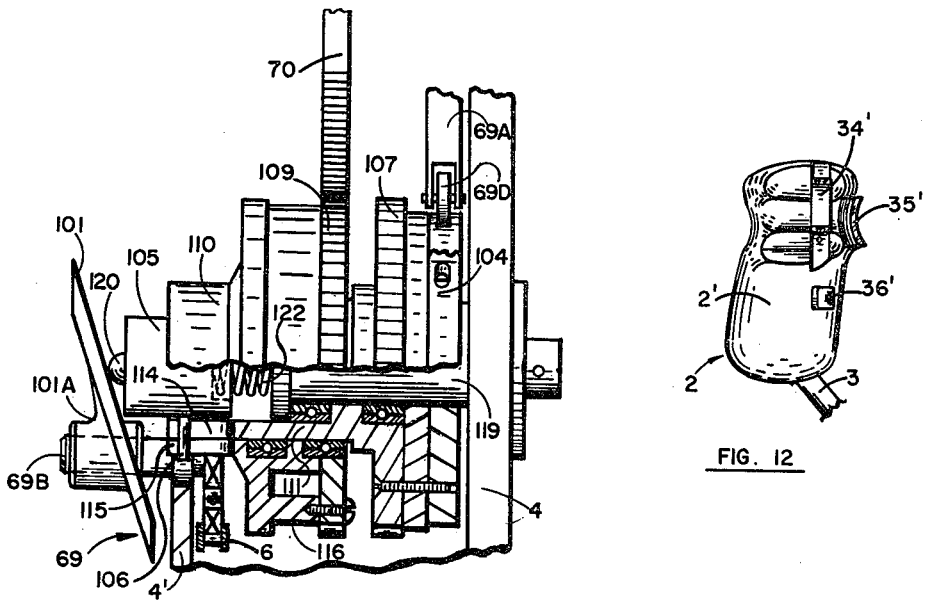
FIG. 11
FIG. 12
INVENTORS
SAMUEL M. BRAININ
FRANK VYZRALEK JR.
BY
ATTORNEY June 2, 1964     S. M. BRAININ ETAL     3,135,955

SEARCH CONTROLLER

Filed Feb. 15, 1960     14 Sheets-Sheet 11

*INVENTORS*
*SAMUEL M. BRAININ*
*FRANK VYZRALEK JR.*
BY

ATTORNEY

United States Patent Office 3,135,955
Patented June 2, 1964

3,135,955
SEARCH CONTROLLER
Samuel M. Brainin, Whittier, and Frank Vyzralek, Jr., Redondo Beach, Calif., assignors to North American Aviation, Inc.
Filed Feb. 15, 1960, Ser. No. 8,883
16 Claims. (Cl. 343—7)

This invention relates to an antenna search controller, and particularly to means operable by a pilot for the control and stabilization of the search mode for air-to-air target acquisition.

The present invention forms a part of the radar equipment of a complete airborne armament control system, which includes also a fire control computer, a flight data computer, a maneuverable autopilot, and an integrated power supply. These components cooperate to enable the pilot to locate and close with his quarry most expeditiously, and to complete a successful interception after the target is acquired. The armament control director supplies signals to the autopilot to provide automatic guidance of the interceptor, and precision fire control information to the pilot's indicator in air-to-air attacks with guns and rockets under all weather conditions.

In air-to-air tracking by radar it is necessary for the pursuit plane to "acquire" the target before subsidiary circuitry can be brought into play which will "lock on" the target, so that tracking may thereafter be automatic, leaving the pilot free to devote attention to other phases of the control of his aircraft.

A number of systems, ground-based and ship-based, as well as air-borne, are in use for locating the target approximately in relation to the attacking plane so that the interceptor pilot may more easily make the initial acquisition. The maximum range of acquisition in a particular radar equipment with which this invention is used may extend up to a distance of 90 miles. The maximum is reduced to 45 miles when operating in the intermediate range, and to 15 miles at close range. In order to pick up a target there must be sufficient power in the radar transmitter to send radar pulses to the area that the prospective target occupies, and to cause an echo to be returned therefrom strong enough so that it may be readily visible on the pilot's scope.

Particularly at the longer ranges, the energy returned may be so small as to present serious difficulties in obtaining a good visual indication on the pilot's scope, or in making effective the automatic tracking circuits. Even in those cases where the pilot has picked up a target at a distance, and has made substantial progress toward interception, it is still a frequent occurrence to lose contact, that is, to be unable to identify the target or separate it from other noise or competing reflections, at the times of shifting from one range bracket to another. Hence, ready control of the search modes is desirable, in order that the pilot may quickly re-acquire his target in case of loss. It is also very helpful to be able to track the target while scanning.

The present application discloses a device having improved means for control by the pilot of the direction in which the antenna points at any time, an antenna search programmer, and a stabilization computer employing a minimum of electronic equipment. The pilot may operate the means for controlling the direction of the antenna through a control handle to select the axis heading about which the radar will search repeatedly in accordance with the commands of the antenna search programmer. The signals are smoothed and properly related to the airframe axes by the means for correcting for short-term or transient changes in roll and pitch, and by the stabilization means. As soon as the pilot has located, or acquired, his target, he may switch to the tracking mode, in which the plane may be guided either on a track-while-scan course or by the use of the azimuth cursor to bring it to a position wherein the target is within range of the interceptor's armament as rapidly as possible.

The present invention is an improvement on the system disclosed in the pending application of Samuel Brainin, filed May 10, 1954, Serial No. 428,767, entitled "Space Stabilization of a Search Pattern," now Patent No. 3,078,-455, and assigned to the assignee of the instant application.

The invention here disclosed is primarily an electromechanical antenna search controlling system, and is more reliable, easier to maintain, weighs substantially less, and offers better performance than existing entirely electronic systems. It employs four selective modes of operation which the pilot may utilize to acquire and hold his target most efficiently. These modes, in a described embodiment, include a choice of wide (120°) or narrow (40°) scan in azimuth, and two bar (8°–10°) or one bar (4°) in elevation. The radar antenna is continuously traversed through the selected mode, except when "locked on," to make and maintain contact with the target. The system will completely stabilize against interceptor roll for small azimuth angles, but will only partially stabilize against interceptor pitch, which is of relatively less importance.

The term "stabilize" as used hereafter means the conversion of values developed in one set of coordinates to corresponding values in another set of coordinates. Thus, the proper relation is obtained between the space coordinates, or values referenced to the earth, and the airframe or interceptor coordinates, that is, values referenced to the longitudinal and transverse axes of the airplane itself.

This stabilization is a separate operation from the correction for transient changes in the attitude of the craft such as pitch, roll, and yaw, which may be obtained by the use of rate gyros (not shown) to provide rate stabilization in a conventional manner.

It is intended that a sinescan motion may be superimposed on the programmed and manually modified search pattern. For a full discussion of the means for accomplishing such a motion, reference is made to the Brainin application, Serial No. 428,767, now Patent No. 3,078,455, mentioned above.

The objects of the invention thus include providing an improved mechanism for controlling the search phase in air-to-air radar target acquisition.

Another object is to provide an improved system for enabling an airborne pilot to locate a radar target in the air, using a programmed antenna search pattern, to which may be added at will a directional search control effected by the pilot.

A further object is to provide an improved system for directing a radar search toward the particular portions of space in which it is anticipated that targets will be most likely to be found.

A still further object is to coordinate the boresight direction of a radar antenna with the movements of a control handle operable by the pilot, in a simple and effective manner.

Yet another object is to provide a search controlling mechanism which is mechanical in nature and has a minimum of parts subject to breakage or malfunction.

An additional object is to eliminate the necessity for a separate roll servo assembly.

These and other objects of this invention will become apparent from the following specifications when taken with the accompanying drawings in which:

FIG. 10 is a schematic elevational view taken from the right of FIG. 1, as indicated by line 10—10 of that figure, with the housing removed to show the relation of certain parts;

FIG. 11 is a schematic fragmentary view, partially in section, taken in the direction indicated by line 11—11 of FIG. 7, but showing the detent clutch mechanism in wide scan position;

FIG. 12 is a side elevational view of the control handle;

The device of the invention is intended as an essential part of the overall system for controlling the flight and the armament of the plane. It is arranged to cooperate directly with other system components, the combined function of which is to fly the plane, search for targets, and make all the computations necessary to direct the plane and its armament on the most efficient course to accomplish the destruction of the selected target.

Figure 21:
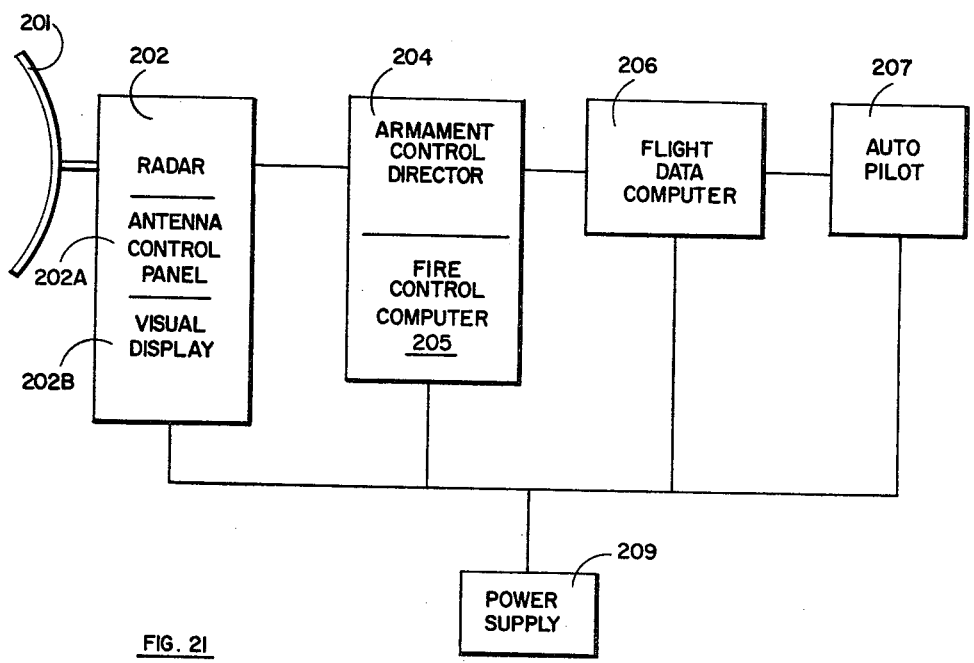
FIG. 21 is a block diagram showing the major elements of the system with which the control panel of the invention is to be used.

The generalized block diagram shown in FIG. 21 indicates the major system elements with which the invention is utilized. The radar antenna 201 sends out signals from the radar equipment 202, and returns target echo signals to that equipment. The radar 202 includes antenna control panel 202A for automatically, and at will, directing the boresight axis about which the antenna will search, and display means 202B for presenting information to the pilot visually on the indicator shown in FIG. 18.

Figure 18:
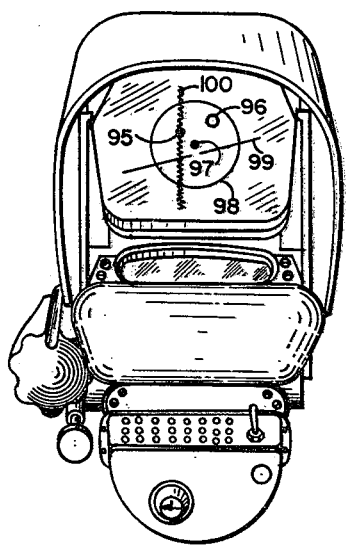
FIG. 18 is a front view of the pilot's indicator, showing a typical tracking display thereon.

The pilot's indicator as shown in FIG. 18 may have its face illuminated by a conventional multiple gun oscilloscope, such as that described in the application of Rulon G. Shelley for an "Approach Course Display System," Serial No. 637,729, filed February 1, 1957, now Patent 3,102,262, and having a common assignee with the instant case. This arrangement may utilize time-sharing principles well known in the art to present several types of information simultaneously on a long persistence screen.

Figure 18D:
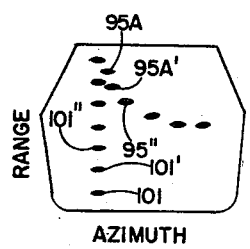
FIG. 18D illustrates a typical range versus azimuth B-scan search display on the pilot's indicator.

For example, the echoes received from the target plane may be presented with target range as a function of azimuth with a conventional collapsed B-scan cursor during the search phase, as shown in FIG. 18D. Alternatively, in the tracking phase as shown in FIG. 18, a steering error dot, a boresight dot, a range rate circle, and an artificial horizon may be displayed, and a bearing cursor, the position of which may be set in by means of a cursor bearing knob. By steering the plane to keep the target alined with the cursor, the pilot is able to head toward his quarry while continuing to scan to find additional targets. He is thus able to track while scanning.

The information obtained by the radar equipment is utilized by the armament control director 204 to plan the operations of the various elements making up the interceptor's armament.

Part of the command information so planned is developed in the fire control computer 205, which forms a part of the armament control director 204. The data utilized in these operations is in part supplied by a flight data computer 206. Additional data is supplied by, and information furnished to, the maneuverable autopilot 207.

All of these component systems may be energized by a common, integrated power supply system 209.

The present invention is concerned directly with the proper interpretation of the radar signals, and the most effective use of the radar equipment.

It will be appreciated that whenever the interceptor changes its position in pitch, roll or yaw, the direction relative to the interceptor airframe from which the radar echo signals arrive will likewise change, and hence the apparent position in space of the target will vary.

Figure 19:
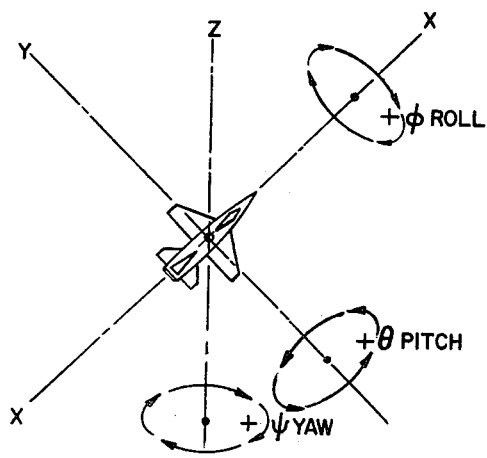
FIG. 19 is a schematic showing of the relation of pitch, roll and yaw to the axes of reference of the plane in which the search controller of the invention is installed.
Figure 20:
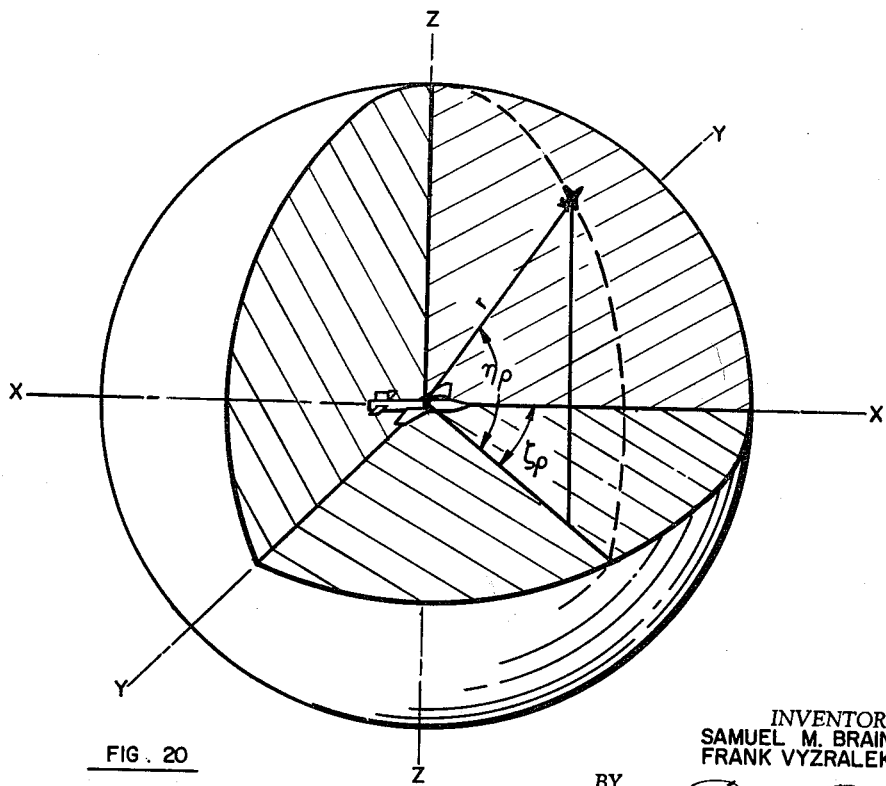
FIG. 20 is a schematic showing of the angular relations in azimuth and elevation between the intercepting and the target plane.

If the pilot's display and the input to the fire control computer and other associated equipment are not to be adversely affected, the input signals must be transformed accordingly, or "stabilized." These changes of position, and their angular designations in relation to the plane axes, are shown in FIG. 19, while FIG. 20 illustrates the azimuth angle $\xi_p$ and the elevation angle $\eta_p$ of a target relative to the interceptor. The interceptor is shown at the center of a "unit sphere," that is, a sphere whose radius $r$ from interceptor to target is taken as unity in order to simplify the various mathematical relations. The basic reference for the attitude of the plane relative to the earth is provided by the vertical gyro. Correction signals indicative of the angles of pitch ($\theta$) and roll ($\phi$) are delivered to the system from synchros associated with that gyro. Since both the human pilot and the autopilot try to maintain the heading of the interceptor continuously in the direction of the target, the yaw ($\psi$) angle becomes less important at this point.

A simplified result, accurate for small angles, may be obtained by taking the antenna control error signals derived from position data obtained from an antenna azimuth resolver and an antenna elevation resolver at the airframe-fixed component level, unstabilized. The resultant signals may be electrically compared in differential junctions with airframe-referenced command signals from the programmer. By an equivalent of a matrix transformation, effected in passive networks, the signals programmed in stabilized coordinates are converted to signals programmed in airframe coordinates and compared in the command section. The stable programmed signals may also be modified by the pilot through his control handle prior to the roll stabilizing transformation. The pitch and roll stabilizing corrections are obtained by comparison with the input from the vertical gyro.

Similar transformations must be accomplished to supply proper control signals to the radar antenna as it executes the search pattern as programmed or as modified by the pilot's manual control. Elimination of eight sets of resolvers for the antenna is accomplished by these transformations, requiring no elements slaved to the antenna in roll and pitch.

To recapitulate, the system as thus far described for radar search control is effective to stabilize the programmed search signals relative to the airframe, to stabilize the manually commanded search signals and to combine them with the stabilized programmed signals. The theory of such stabilization is expanded hereafter. The system will also provide for course information display, track-while-scan, and give the pilot additional guidance. In accomplishing the stabilization, the invention makes use of certain mathematical transformations and approximations effective to provide solutions to the problems involved with a minimum of relatively simple equipment. It utilizes mechanical means which are relatively free from trouble and require a minimum of space and weight.

*Operation and Structure of the Mode Selecting Mechanism*

The preferred mechanisms have been developed for effecting the mode selection in the radar control panel, that is, the choice of wide or narrow scan in azimuth and elevation to aid in acquiring and holding the target. In one exemplary embodiment, which will be described first in connection with FIGS. 2 and 3, the control handle 2 may be used to change the direction of the radar antenna and the position of the display on the radar screen, while a single mode selector handle 10 is used to determine the azimuth and elevation modes employed. Handle 2 and shaft 3 may be moved by the pilot through about a 45° arc relative to a normal to the plane of the panel, not shown in FIG. 3, and throughout 360° about the center of shaft movement, which lies in a gimbal structure described hereafter. This handle then is used by the pilot to control the position of the antenna and of the display on the radar indicator panel 5, shown in FIG. 18, on which he observes echoes returned to the radar system. A typical B-scan presentation on the face of the panel 5 is shown during the search phase in FIG. 18D, with pips representing a target indicated at a succession of positions 95A, 95A', 95'', etc., as it is located and continues to be tracked in range and azimuth. The range is indicated by the position of the target in relation to the range pips 101, 101', 101'', etc. The azimuth is indicated by the position of the target pips from left to right along the azimuth axis.

Figure 15:
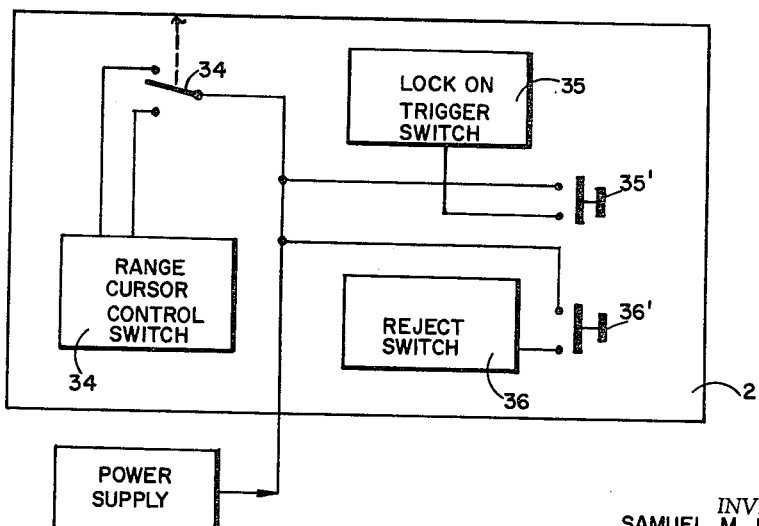
FIG. 15 is a wiring diagram of the handle shown in FIGS. 12 and 14.

When the pilot has "acquired" his target, he may shift to the tracking phase presentation of FIG. 18, with the target echo shown at 95, a steering error dot at 96, boresight dot at 97, a range rate circle at 98, an artificial horizon at 99, and a collapsed B-scan cursor at 100. He accomplishes this change in presentation on his radar indicator panel 5 by simply pressing the lock-on trigger 35' on control handle 2, which actuates conventional switching circuitry, schematically shown in FIG. 15.

By properly controlling the plane in accordance with the display on the indicator panel, the pilot is able to fly it toward the observed targets, and may be aided by the autopilot in maintaining the proper heading. While in the tracking mode, holding the target echo 95 in line with the cursor 100 keeps the plane on a collision course. This is called "collision-track-while-scan" operation, since at the same time the antenna continues to scan the space ahead. The target echo 95 and cursor 100 are provided by the structure disclosed in detail herein. The others are provided by conventional apparatus, not shown. The selection of the particular one of the four possible modes of search may be accomplished through the use of the mode selector handle 10, acting through mechanical linkages indicated generally at 11 to control the extent of the programmed elevation and azimuth motions of the antenna. Handle 10 is mounted for movement on a ball joint 10A rotatably disposed in a socket plate 10B fixed relative to the control panel. By means of the linkage indicated generally as 11, the pivotally mounted elevation toggle 11A, and the axially translating yokes 11B, the clutch 12, which is rotatably mounted on elevation synchro shaft 45, may be employed to turn the rotor of the elevation synchro 14, causing the antenna to be instructed to search in a programmed two-bar mode. Clutch 12 inserts the motion as delivered to it, through elevation cam follower arm 15A, from elevation cam 15. When handle 10 is in a neutral position, that is, not actuated in elevation to select the one-bar or two-bar scan, a one-bar elevation scan is provided. The elevation cam 15 is driven by the motor 17 through the gear drive 17A and 17B. Motor 17 is driven at a constant speed, such as 8000 r.p.m., and the gear drive is so chosen as to effect the desired rate of movement of the antenna in following the programmed search pattern, which is of the order of two complete cycles per second. The elevation synchro 14, which has first and second dual windings 14A and 14B, respectively (FIG. 2), also controls the elevation of the antenna in accord with the coupling from the control handle 2 to the synchro case. The synchro output is then effective to position the antenna in accord with the programmed elevation as modified by the manual controls, roll-stabilized as described hereafter. Similarly, the selector handle 10 acting through the linkage 11, an azimuth toggle 11B, and retracting yokes 11D, may select either the 40° or the 120° azimuth scan through shifting axially the position of the double throw azimuth clutch member, indicated generally at 19, and mounted fixedly on azimuth mode selection shaft 19B. A conventional clutch, shown generally at 19D, joins shaft 19B to a coaxially mounted extension shaft 19E' adapted to receive manual azimuth commands through azimuth helical gears 29A and 29B. These manual commands are inserted through gear 19E, mounted rotatably upon shaft 19B, and a meshing gear 19F secured to rotate the stator of azimuth synchro 22. The programmed azimuth commands are inserted through the rotational oscillation of clutch 19, which turns back and forth as clutch follower arm 19A follows the heart-shaped azimuth cam assembly 24.

In one position the clutch mechanism acts through the 40° reduction gears 20A and 20B. Gear 20A is rotatably mounted on shaft 19B, but restrained against axial shifting by a collar 19F', and gear 20B is fixedly mounted on the rotor shaft 44 of azimuth synchro 22, to give the narrow azimuth search mode. In the other position, clutch 19 acts through the 120° reduction gears, 21A and 21B. Gear 21A is restrained against axial shifting by collar means, not shown, but is rotatably mounted on shaft 19B. Gear 21B is fixed on rotor shaft 44 to oscillate the azimuth synchro rotors and thus give the wide azimuth search mode. By these means the azimuth synchro 22, which has first and second dual windings 22A and 22B (FIG. 2), is controlled, and in turn controls the position in azimuth of the antenna through a suitable servo loop, including resolvers mounted on the antenna by which the actual position is compared with the programmed position, and the resultant error signal used to control the servo drive means.

The cam assembly 24 receives the drive to be transmitted to the azimuth synchro 22 through gears 17C and 17D from the gear 17A driven directly by motor 17. When selector handle 10 is in a neutral position so that no mode has been selected, suitable azimuth and elevation detent springs 25 and 26, respectively, return the elevation synchro 14 and the azimuth synchro 22 to a zero reference position. In this neutral position, clutch 19 drives neither gear 20A nor gear 21A, and azimuth synchro shaft 44 is at rest.

When the manual control handle 2 is moved, motion is transmitted through the gimbal structure, indicated generally as 27, by means of the azimuth helical gears 29A and 29B, and elevation helical gears 30A and 30B, to cause rotation of the cases of the azimuth synchro 22 and the elevation synchro 14, thus adding the element of the pilot's judgment to the programmed search command signals.

Figure 1:
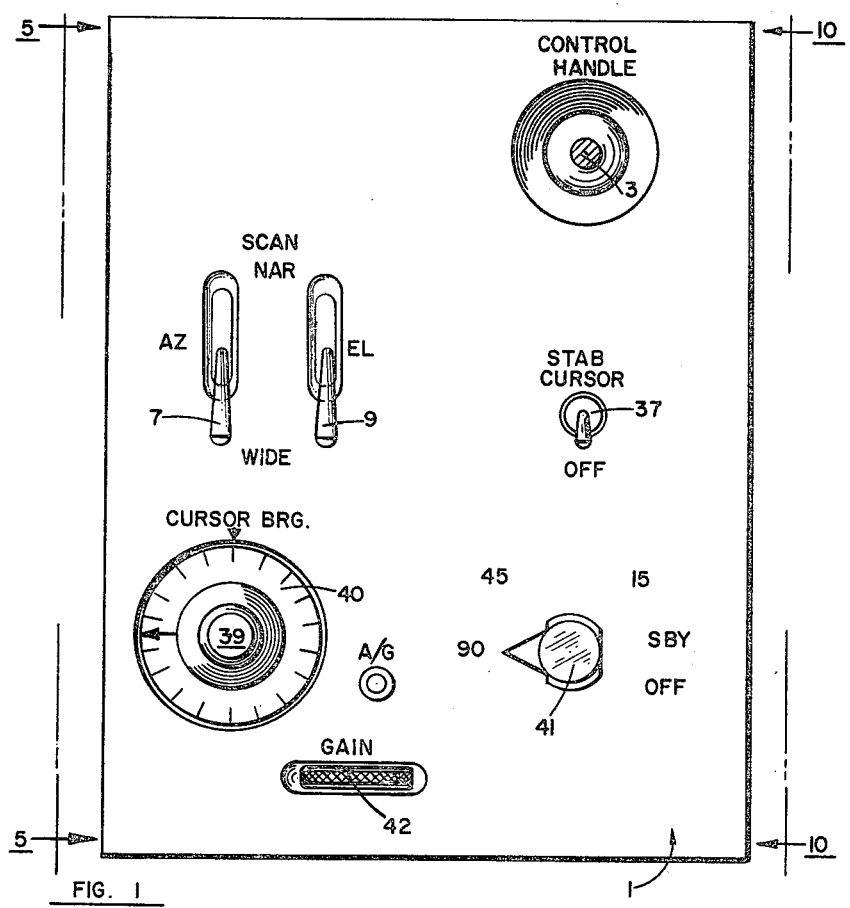
FIG. 1 is a front elevational view of the radar control panel.

Mode Selector of FIG. 1

Another preferred embodiment is shown in FIG. 1. This arrangement utilizes the mode selection structure shown in the block diagram of FIG. 4 in the mode selection and programming portion of the schematic of FIG. 2. In the embodiment of FIG. 1, the mode selector handle 10 and its associated linkages 11 of the embodiment of FIG. 3 are replaced by the azimuth mode selector lever 7 and the elevation mode selector lever 9, mounted on the control panel 1. These mode selector levers accomplish the same purpose as does the mode selector handle 10 in the embodiment of FIG. 3, using flexible chain drives and associated gear and clutch mechanisms in place of the lever and toggle arrangement there shown.

In FIG. 1, the radar control panel, indicated generally as 1, is shown in elevation. The shaft 3, upon which the control handle 2 is mounted, is shown in section, and the handle 2 omitted for clarity of illustration. The handle 2 and its mode of operation may be seen in detail in FIGS. 9, 12, 14, and 15. It has a range cursor control switch 34 operated by a range cursor control knob 34'. Lock-on is effected by a lock-on switch 35 under control of a lock-on trigger 35'. Adjacent the handle 2 are the azimuth and elevation mode selector levers 7 and 9 respectively, which act through suitable mechanical linkages, described later. The azimuth mode selector lever 7 can be placed in either of two fixed positions, one for a narrow, or 40° scan, and the other for a wide, or 120°, scan. In both cases, the antenna moves through the selected arc on both sides of center of the radar indicator display. This controls the azimuth angle through which the antena will be traversed as it is driven automatically in the search mode to scan the selected area. Selector lever 9 controls the vertical extent of the pattern displayed on the pilot's indicator.

Figure 18A:
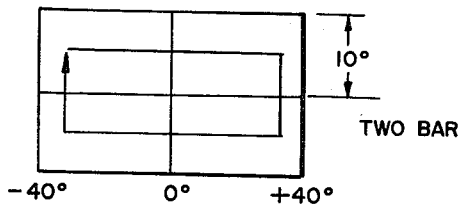
FIG. 18A illustrates the programmed antenna motion for a 40° two-bar scan.
Figure 18C:
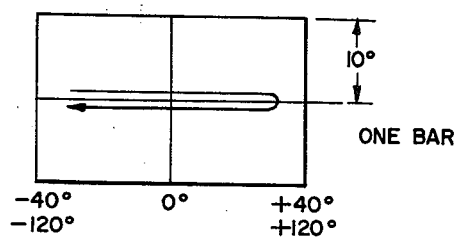
FIG. 18C illustrates the programmed antenna motion in a one-bar scan for both 40° and 120° modes in azimuth.
Figure 18B:
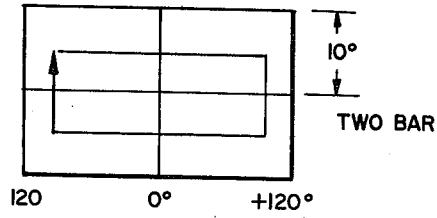
FIG. 18B illustrates the programmed antenna motion for a 120° two-bar scan.

In the one-bar position, the vertical extent of the pattern of the pattern is aproximately 4° about the horizontal midline of the scanning pattern. In the two-bar position, the pattern represents a vertical range of from 8° to 10°, depending on beam overlap. The outer limits of these scanning patterns and the direction of scanning to obtain the information presented on the pilot's indicator 5, are as shown in FIGS. 18A, 18B, and 18C. Assuming that the control handle 2 is centered, the pattern is shown in FIG. 18A for the two-bar swept through ±40° in azimuth. A wide beam is used, for example, 10° in width, sweeping first to the right, next dropping and sweeping to the left, and then rising to the original position, as indicated by the direction arrows in these figures. FIG. 18C shows the one-bar pattern for both the narrow and wide scan modes. In the one-bar pattern, the antenna merely sweeps back and forth, and does not change its elevation angle.

Below the control handle 2 and shaft 3 is mounted a two-position switch 37 which turns on or off the stabilization effect on the cursor presented on the pilot's indicator 5 in the collision-track-while-scan mode, or CTWS. A knob 39 having an associated dial face 40 preferably graduated in 10° intervals from zero to 360° is provided to adjust the bearing of the cursor. In CTWS the cursor represents the desired bearing of the plane heading relative to the line of sight to target, that is, the azimuth upon which the plane must be flown, for a lead collision course. The pilot maneuvers the plane to keep the target dot on the cursor and thus flies the collision course to the target.

A range selector knob 41 is mounted in the lower right corner of control panel 1. The control panel, including a three-phase program motor 17, may be turned on or off, placed in standby position, or its range set at 15, 45, or 90 miles, in accordance with the position of range selector knob 41 which controls appropriate associated electrical circuits, not shown here in detail, but of conventional character.

Gain control member 42 may be used to adjust the gain of the radar receiver.

The handle 2 is connected through shaft 3 to a gimballing arrangement 27 (FIGS. 5, 7, 8, and 10), corresponding to that shown in FIG. 3, and is free to move in a substantial arc about the gimbal center. This enables the pilot to change at will the direction in which the radar antenna searches, and, correspondingly, the position of the display on the face of the indicator shown in FIG. 18. The gimballing arrangement permits directing the antenna in azimuth, in elevation, or in a combination of both movements. This arrangement is a counterpart of the gimbal mounting of the antenna itself.

The radar control panel provides roll-stabilized search signals to the antenna controller and, as detailed above, includes all system controls and switches. This arrangement eliminates the need for a separate roll servo assembly.

Figure 16:
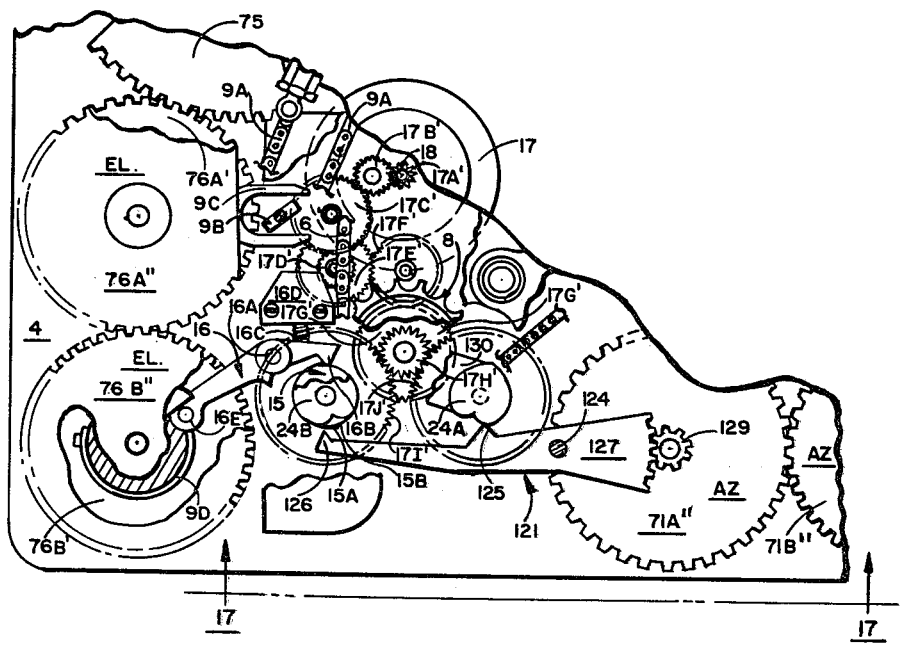
FIG. 16 is a fragmentary sectional view, partly broken away, corresponding to the showing in FIG. 5, with additional details of mode selection mechanism set for operation in the wide scan mode.
Figure 17:
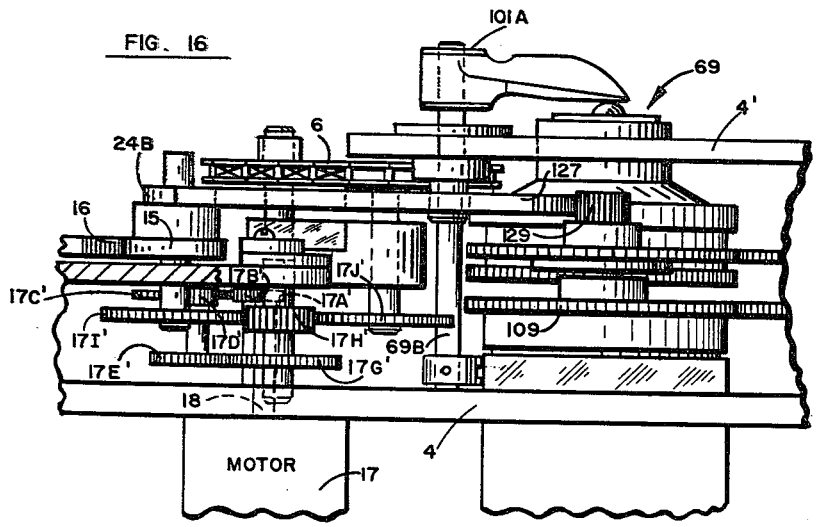
FIG. 17 is a bottom view taken looking in the direction indicated by line 17—17 of FIG. 16.

The control panel shown in FIG. 1 has mounted on its reverse side a supporting frame 4 in which is fixed a small three-phase electric program motor 17, as seen in FIGS. 10 and 16. Sub-frames 4' and 4" are mounted on and spaced from frame 4 to provide added support for the various elements. The motor 17 has a drive shaft 18 and a gear train 17A', 17B', 17H', which acts to rotate the elevation and azimuth narrow scan cam drive gear 171' and the azimuth wide scan cam drive gear 17J'. Elevation and narrow scan azimuth drive gear 171' drives directly on elevation program cam 15 and the narrow scan azimuth cam 24B, which is heart-shaped. The wide scan azimuth cam 24A, also heart-shaped, is driven directly from the azimuth wide scan cam drive gear 17J'. Elevation cam 15 has one semi-cylindrical half 15B of a lesser radius, as described in detail hereafter.

Figure 4:
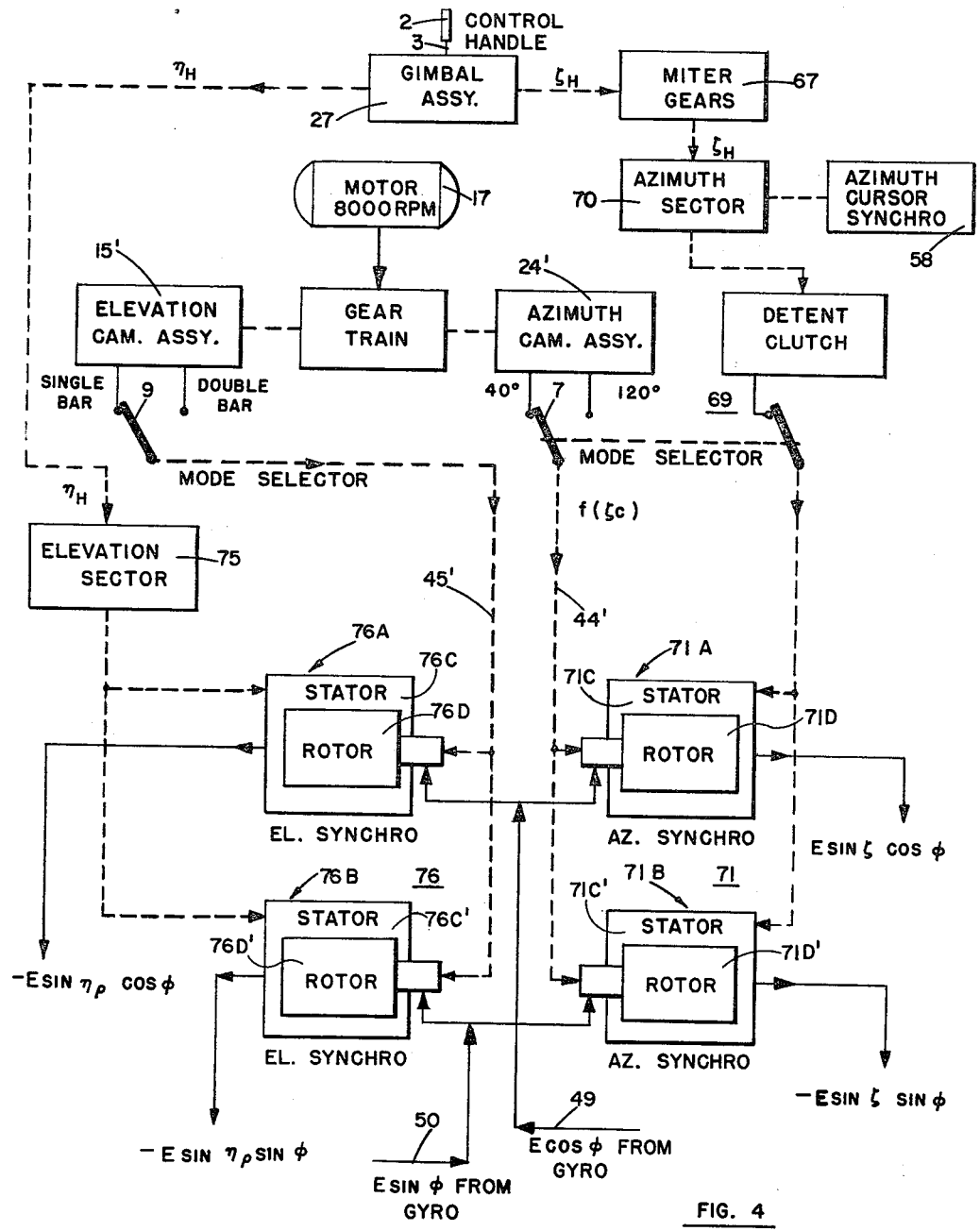
FIG. 4 is a schematic functional block diagram of another preferred embodiment of a portion of the programming means of the invention.
Figure 5:
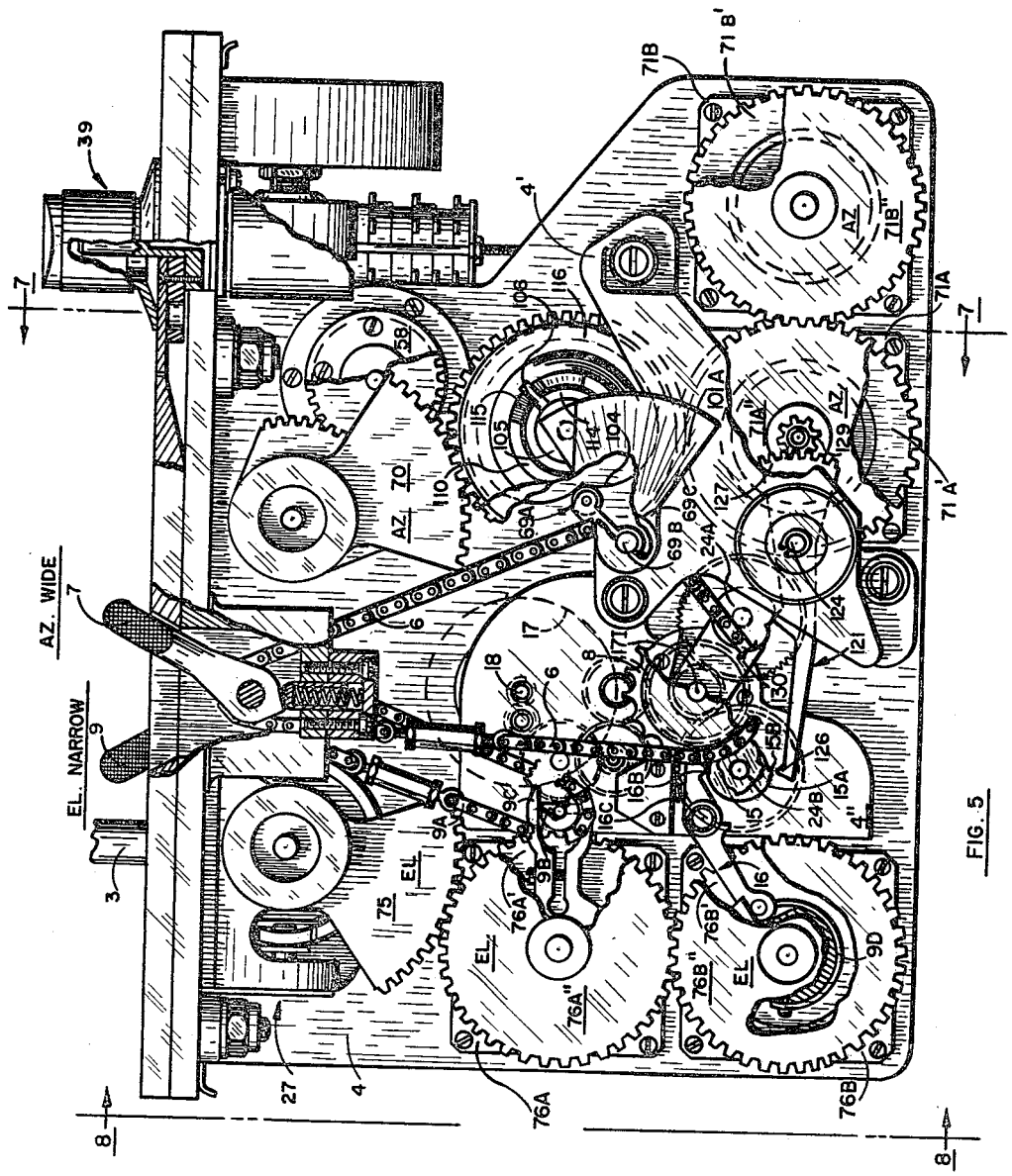
FIG. 5 is a side elevation, partially broken away, taken from the left of the panel as shown in FIG. 1, looking in the direction indicated by line 5—5 of that figure, to show details of the mechanism embodying the circuitry of FIG. 2 and FIG. 4, with the mode selection levers set in the wide azimuth and narrow elevation scan positions.
Figure 6:
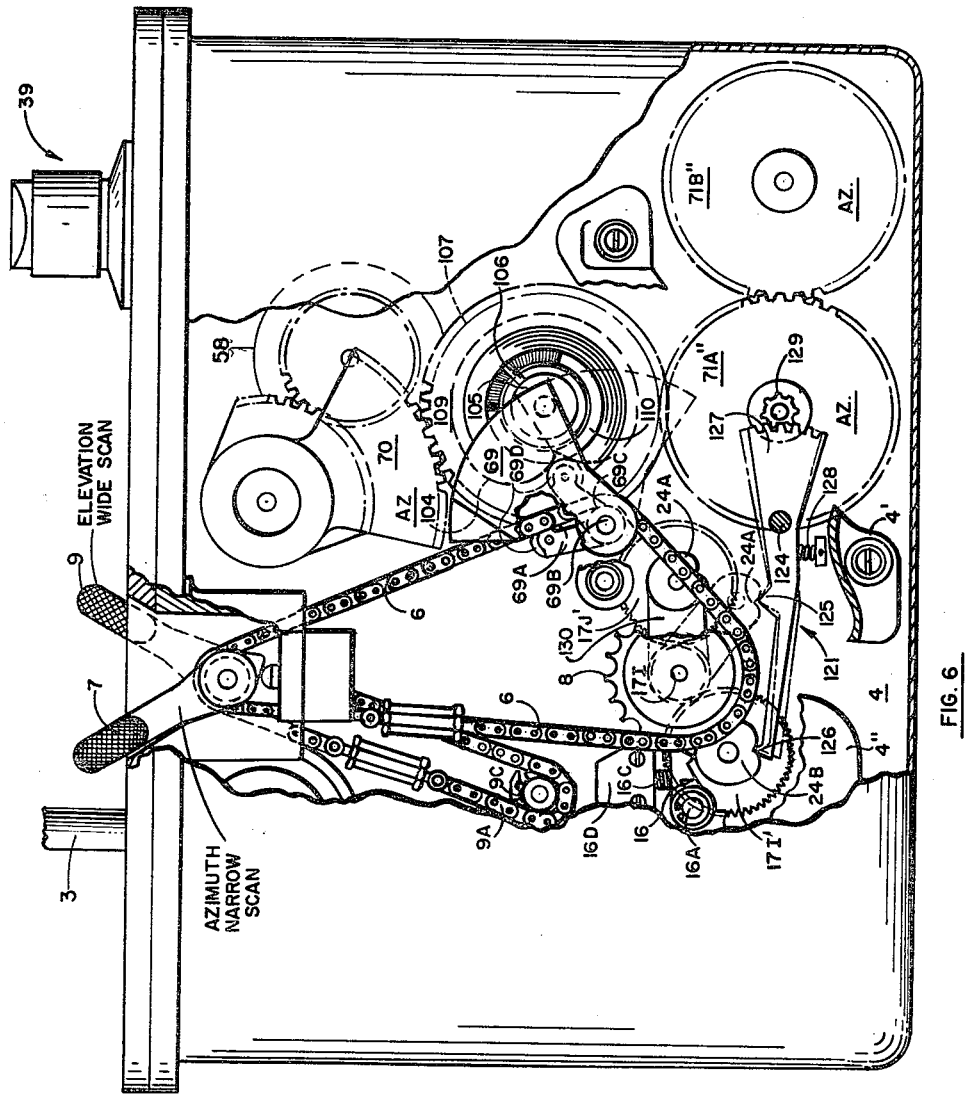
FIG. 6 is a view corresponding to that of FIG. 5 but with the azimuth mode selector lever in position for operation in the narrow scan mode, and the elevation selector lever set for operation in the wide scan mode.

The wide scan azimuth cam 24A provides a 120° antenna azimuth sweep and the narrow scan azimuth cam 24B provides a 40° antenna azimuth sweep, as chosen by the azimuth mode selector lever 7, as seen in FIGS. 5 and 6. These elements make up the programmed azimuth cam assembly 24', shown schematically in block form in FIG. 4, which corresponds to the assembly 24 shown in FIG. 2. The azimuth and elevation cam followers are coupled through means, seen in later figures, to the rotors of two dual synchro control transformers indicated generally as 71 and 76 in FIG. 4, which correspond functionally to the dual control synchros 22 and 14, respectively, in FIG. 2. It is from these synchros that signals are then furnished to the antenna servo system, which directly carries out the antenna drive as commanded.

Since it is desired to provide four different modes of search operation, it is necessary to have two types of azimuth motion, wide angle, or 120°, scan, and narrow angle, or 40°, scan; and two types of elevation motion. The elevation types, as mentioned above, are the "single-bar," or narrow scan, which covers approximately 4°, and the "double-bar," or wide scan, which covers about 8° to 10°, depending on the beam width adjustment. The transition between either azimuth mode is accomplished by means of a shifting lever which moves one or the other of two cams into contact with pawls on a follower arm. The azimuth and elevation drive cam assemblies 24' and 15', respectively, are mechanically coupled together and driven by the motor 17. Hence the two motions are always in synchronism. The proper azimuth and elevation motions to produce any one of the four desired patterns will be automatically combined by the mechanical arrangement of the search mode selector. Since similar heart-shaped cams are used to produce both azimuth motions, the frame time for the four modes of operation is a constant. It requires approximately two seconds for a complete cycle across and back.

Selection of the azimuth mode by lever 7 is effective through a flexible roller chain 6 to position a sprocket 8 and the detent clutch 69 assembly, described later in connection with FIGS. 5–7. The azimuth mode selection is accomplished by rotating sprocket 8, which is fixed on a shaft 17I. Shaft 17I also has fixed thereto an azimuth mode selector cam pivot arm 130. Turning sprocket 8 shifts the arm 130 and cam 24A relative to the wide scan pawl 125. These elements are also seen in detail in FIG. 16. Both the wide scan pawl 125 and the narrow scan pawl 126 are formed as part of an azimuth scan selection member 121, pivotally mounted at 124. The narrow scan pawl 126 is disposed at a radius from the pivot 124 three times that of pawl 125.

When arm 130 is in the wide scan position shown in FIGS. 5 and 16, and in dotted outline in FIG. 6, cam 24A is engaged by the wide scan pawl 125, which is urged resiliently thereagainst by spring means 128, seen best in FIG. 6, suitably fixed relative to the supporting sub-frame 4'. The motor drive through shaft 18 and the gear sequence terminating with gear 17J' continuously rotates the heart-shaped cam 24A, and causes a rocking motion of the pawl-carrying member 121 about its pivot 124. This motion acts through the sector gear 127, formed at the end of member 121 opposite the pawls 125 and 126, to rotate reciprocally the pinion gear 129. Pinion gear 129 rocks the rotors 71D and 71D' (FIG. 4) of the azimuth synchrous 71A and 71B back and forth relative to the stators 71C and 71C', respectively, through gears 71A" and 71B", and thus feeds the azimuth wide scan search command signals into the system.

Similarly, when the arm 130 is shifted to the narrow scan position, as shown in solid lines in FIG. 6, cam 24A is rocked out of engagement with pawl 125. Spring means 128 may then urge the narrow scan pawl 126 into engagement with the azimuth narrow scan cam 24B, which will produce reciprocating rotation of the rotors of azimuth synchros 71A and 71B through an arc one-third that in the wide scan mode.

Selection of the single bar (narrow scan) or double bar (wide scan) elevation mode by lever 9 acts as seen in FIGS. 5, 6, and 16 through the flexible chain 9A to position a rotatable locking member 9B within the arms of an elevation mode selection fork 9C. Fork 9C limits the amount of rotation which may be imparted to the rotors of elevation synchros 76A and 76B, locking them in the narrow elevation mode, as seen in FIG. 5. These synchros correspond functionally to synchros 14A and 14B in the embodiment of FIGS. 2 and 3, controlling antenna elevation.

The elevation cam 15 has semi-cylindrical camming surfaces 15A and 15B of two different radii, as seen in FIGS. 5 and 16. Elevation cam follower member 16 is pivotally mounted relative to the supporting frame 4 of 16A. The elevation cam follower pawl 16B, formed at one end of member 16, is urged against cam 15 as it rotates by resilient means 16C anchored by means of a block 16D to frame 4. The change in position of the pawl 16B is transmitted, within limits set by the locking member 9B and fork 9C, to the rotor 76D' relative to the stator 76C' of the elevation synchro 76B through a connecting member 9D fixed thereto at one end and having its other end pivotally connected to the end 16E of the cam follower member 16 opposite the pawl 16B. Elevation synchro rotor gears 76B" and 76A" cooperate to insert this same rotor movement in synchro 76A, that is, movement of rotor 76D relative to stator 76C.

This is effective to shift the elevation synchro rotors by the amount necessary to produce the desired vertical scanning movement of the antenna.

*Manual Control*

The azimuth and elevation movements of the control handle 2 are coupled to the stators of the synchros, to insert the pilot's addition to the programmed command signals. The rotors of the same synchros are driven, as described above, to receive the programmed instructions inserted by the cam followers. Coupling is accomplished through the use of the gimbal structure 27 and bevel gears 67, and a detent clutch for azimuth, indicated generally at 69, as seen in FIG. 7. The insertion of manual changes in elevation is accomplished primarily by movement of gimbal 27 through sector gear 75, as seen in FIG. 5, whereas the azimuth changes are transmitted by the bevel gears 67 and azimuth sector gear 70. Movements directed through control handle 2 which include both elevation and azimuth components are resolved by the gimbal structure, and the components transmitted separately through the mechanism to effect the commanded changes. The detent clutch 69 permits the 40° azimuth scan to be positioned throughout the 120° sector by the control handle, and causes the 120° scan to be centered about the zero azimuth angle of the antenna. It prevents azimuth control from being exerted by handle 2 in the wide scan position.

The control handle is located in the gimbal structure 27, which is common to both embodiments. It is shown fragmentarily in FIG. 3 and in greater detail in FIGS. 5, 7, 8, and 10. The handle generates an elevation shaft rotation by forward and backward motion, and an azimuth shaft rotation by side-to-side motion, as indicated by the arrows in FIG. 3. These motions are respectively applied to the cases of the elevation and azimuth synchros to control the positions of the stator windings.

Figure 2:
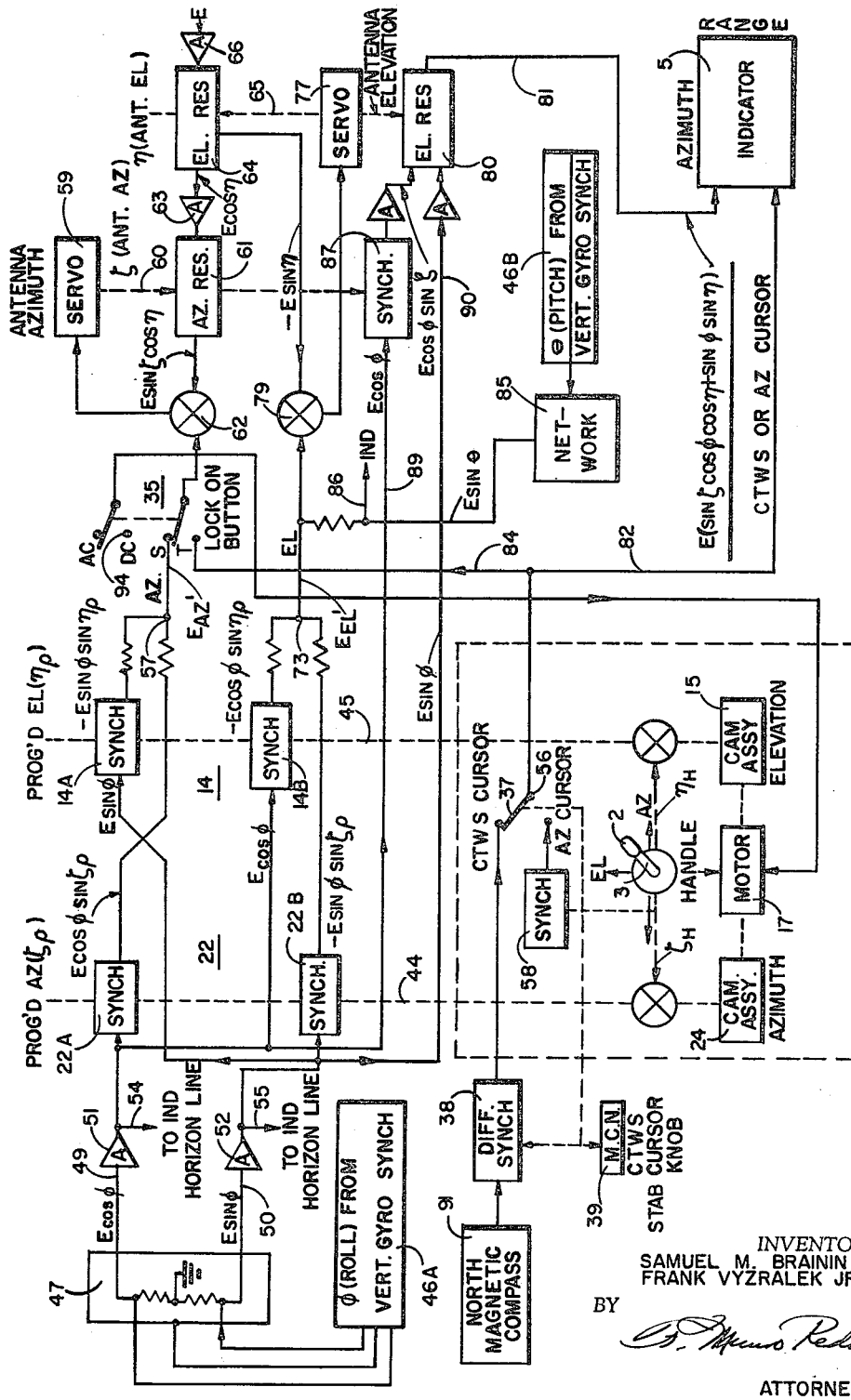
FIG. 2 is a block diagram showing the functional arrangement of the component parts of this invention.
Figure 3:
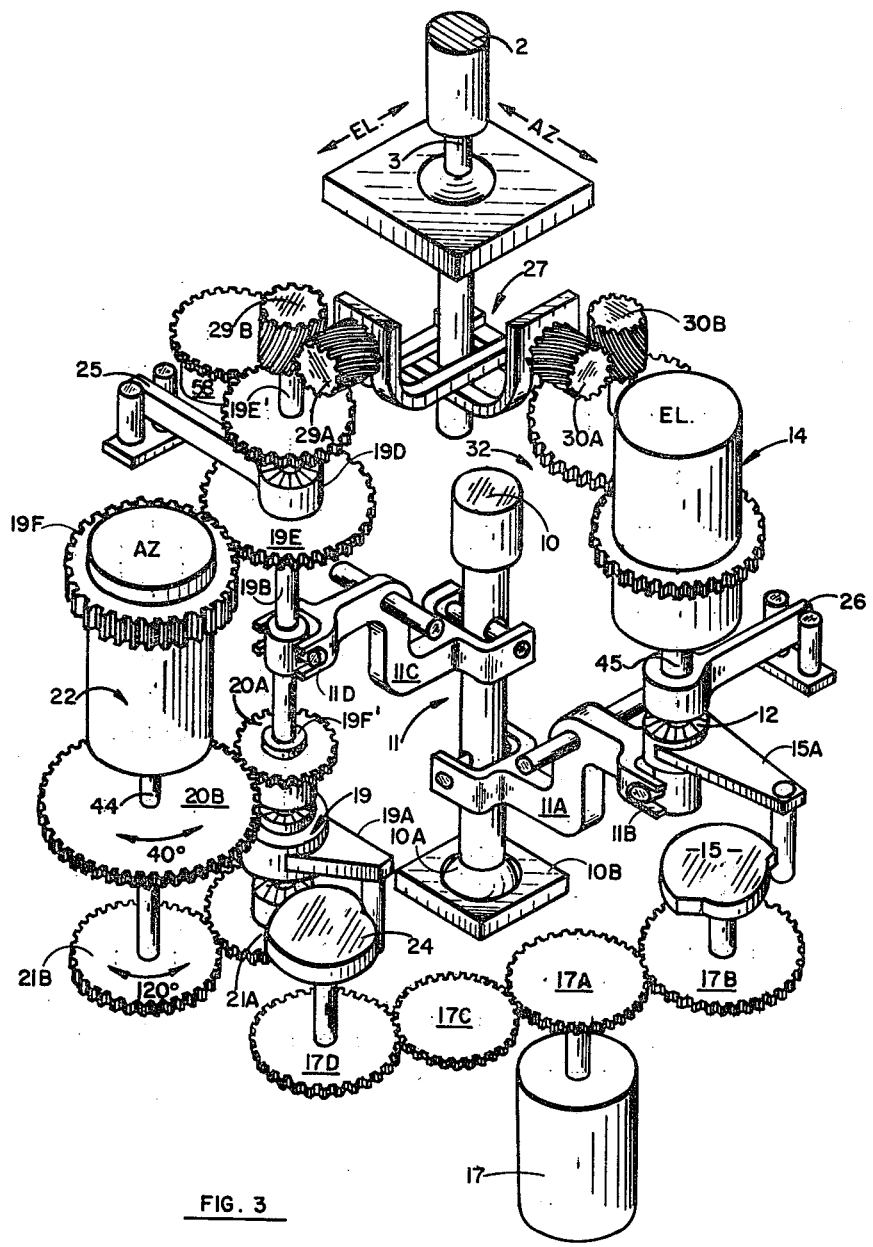
FIG. 3 is a schematic perspective view of the mechanism associated with the control handle for the embodiment of FIG. 2, with the position of some of the parts displaced for clarity in illustration.

The azimuth motion, which is transmitted from the handle 2 through the gearing 29A and 29B in the embodiment of FIGS. 2 and 3, is transmitted by the azimuth sector gear 70 in the embodiment shown in FIGS. 4 and 5. Sector gear 70 operates under one control of the detent clutch assembly, indicated generally as 69, and shown in FIGS. 5–7, 11, 13, and 17. It drives gears 71A and 71B of first and second azimuth synchros 72A and 72B through azimuth synchros actuating gear 109. These synchros 72A and 72B correspond functionally to the first and second azimuth synchros 22A and 22B shown in the circuit of FIG. 2.

The elevation movement is transmitted from the control handle 2 and shaft 3 through the elevation sector gear 75. Gear 75 drives the intermeshing drive gears 76A" and 76B" which control the first and second elevation synchros 76A and 76B, as shown in FIG. 5 and in side view in FIG. 8. These synchros 76A and 76B correspond to the elevation synchros 14A and 14B of the circuit of FIG. 2.

The coupling to the azimuth synchros can be released as seen in FIGS. 5 and 6 by means of the detent clutch 69, at which time the body of the synchro is returned to a zero reference position by the detent arm cam follower locking 69A and roller heart-shaped locking cam 104.

The Detent Clutch

The way in which the detent clutch, indicated generally as 69, functions may be seen from FIGS. 5, 6, 7, 11, 13, and 17.

This clutch acts under the control of azimuth mode selection knob 7 to limit the movement of the synchro stators through which the manual additions to programmed antenna motions in azimuth are commanded. It operates by shifting axially a shaft and pin, which locks or releases one of the azimuth synchro actuating gears 109 relative to the other, 107. The axial shifting is effected through an angularly disposed cam face 101 (FIG. 11) formed on a cam member 101A, which is fixed, together with the cam follower locking arm and roller 69A, on a rotatable shaft 69B. The position of rotatable shaft 69B is controlled by the azimuth mode selection lever 7, acting through the chain 6 which engages a sprocket 69C fixed to the shaft 69B. This chain also controls the position of a detent arm assembly 69A, hereafter called the cam follower locking arm assembly, having a roller 69D, which rides on the surface of the heart-shaped locking cam 104, best seen in FIGS. 5, 6, 11, and 13.

Figure 13:
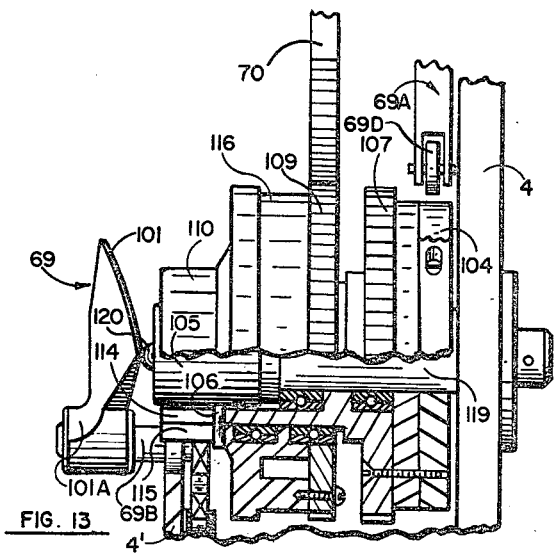
FIG. 13 is a view, taken in the same plane and direction in FIG. 7 as in FIG. 11, but showing the detent clutch mechanism in the narrow scan position.

Cam 104 rotates coaxially with the detent shaft 105, in which the locking pin 106 is fixed. Cam 104 is mounted, however, on a stub shaft 119. As seen in FIGS. 11 and 13, stub shaft 119 supports the azimuth snchro-actuating gears 107 and 109. The azimuth synchro-actuating gears 107 and 109 are disposed coaxially with each other and with an outer cylindrical shaft 110. The outer cylindrical shaft 110 has formed integrally therewith a mounting hub 116 to which gear 109 is directly secured. Within shaft 110 is disposed the inner cylindrical shaft 111, to which is fixed gear 107. Within inner cylindrical shaft 111, in turn, is disposed the axially translatable detent shaft 105 and the supporting stub shaft 119, fixed to frame member 4. Detent shaft 105 is coaxial with, but spaced from, the stub shaft 119. The locking pin 106 is fixed in the detent shaft 105 and projects through a longitudinal slot 114 formed in the body of inner cylinder shaft 111. The longitudinal slot 114 in the inner shaft 111 is disposed for registry with the apex of a V-shaped notch 115 formed in the outer cylindrical shaft 110, when the latter is shifted axially. The pin 106 is free to move with the axially translatable detent shaft 105 throughout the full length of the longitudinal slot 114, but the degree of rotation of detent shaft 105 and inner cylindrical shaft 111 relative to the outer cylindrical shaft 110 is dependent upon the displacement of the pin 106 along the longitudinal slot 114, as may be seen from FIG. 7. The gears 107 and 109 acting together may be rotated coaxially about the inner stub shaft 119. The rotation of gear 109 relative to gear 107 is, however, limited by the locking pin 106, slot 114, and V-shaped notch 115. This limit varies, depending upon the axial position of the shaft 105, and also upon the exact shape of the V-notch, which could also be changed in shape to suit other functional requirements of the mechanism, or produce other relations between the rotating gears 107 and 109. With the V-notch as shown, when the pin is at the apex of the notch 115, as shown in FIG. 7, gears 107 and 109 are locked together. When the pin is at the opposite end of the notch, complete freedom of rotation of gear 109 relative to gear 107 exists. In the narrow scan position of lever 107, a 40° azimuth sweep under manual control is permitted. In the wide scan position of lever 107, the handle 2 may be moved back and forth in azimuth, but is de-coupled from the stators of the synchros, so that no manual command signal may be inserted.

Figure 7:
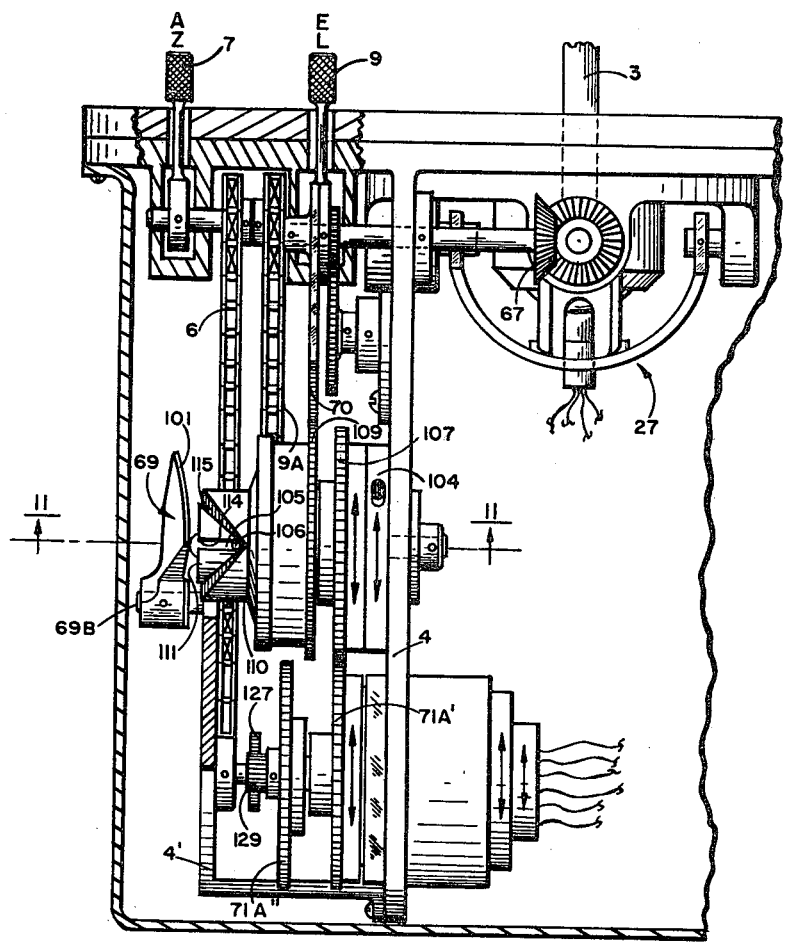
FIG. 7 is a partial sectional view taken in the direction as indicated by line 7—7 of FIG. 5, with the azimuth mode selector lever in the narrow scan position.
Figure 9:
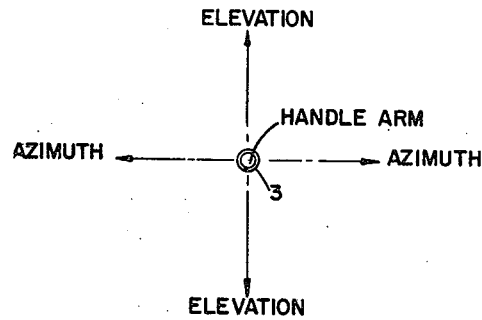
FIG. 9 is a schematic view showing the positions for operation of the control handle.
Figure 8:
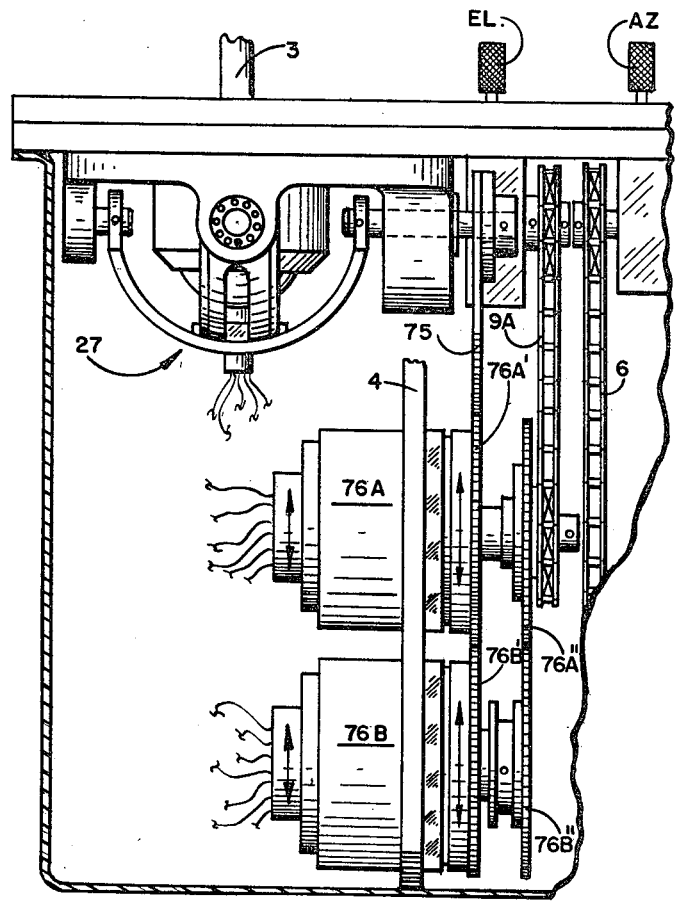
FIG. 8 is a schematic sectional view, partially broken away, taken as indicated by line 8—8 in FIG. 5 to show additional details of the mechanism.
Figure 14:
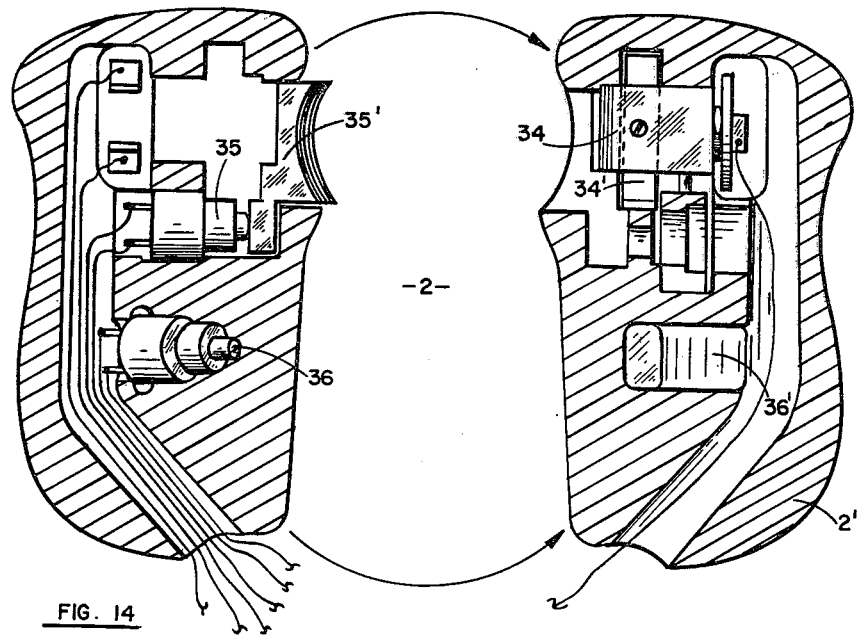
FIG. 14 is a sectional view of the handle of FIG. 12, taken in the plane of the drawing, but with the near half of the handle as shown in FIG. 12 laid over to the right so that the interior construction of both halves may be seen.

The manner in which the camming surface 101 acts on the detent mechanism to limit the width of the scanning pattern in the narrow azimuth mode may be best understood by reference to FIGS. 7, 11, and 13. FIGS. 7 and 13 show in cross-section the camming surface and associated elements of the detent assembly in the narrow locked position. It will be seen in these figures that the cam face 101, formed at an acute angle to the axis of rotation of shaft 69B, has caused an engaging surface 120 mounted terminally of shaft 105 to shift the latter to the right. This forces the locking pin 106 to the apex of its cooperating notch 115. The pin then prevents relative rotational movement of the supporting shafts of the gear members 107 and 109. When pin 106 is locked in notch 114, the angular limit on manual command insertions is effected by the structure of the gimbal itself.

In FIGS. 5 and 11, the camming surface 101 has been rotated on its supporting shaft 69B by movement to wide scan position of the azimuth mode selection lever. As a result, the engaging pawl 120 and the shaft 105 have been permitted to move to the left in FIG. 11 under the urging of an inner spring 122. This releases pin 106 from engagement with the apex of notch 114, and so a much greater degree of freedom for relative rotation of the shaft members 110 and 111 is possible, de-coupling the handle 2 from the azimuth synchros.

By reference to FIG. 5 it will be seen that the movement of the handle 7 and chain 6 also affects the position of the azimuth mode-selecting cam pivot arm 130 so that it may permit engagement of one or the other of the two heart-shaped cams 24A and 24B, seen also in FIG. 5, as described above in connection with mode selection. In wide scan position the engaging pawl 125 will engage the cam 24A, while in the narrow scan position the engaging pawl 126 will ride on cam 24B. This permits the sector gear 127 to control the position of the pinion gear 129, and through it the position of the rotors of the azimuth synchros 71A and 71B.

In summary, the detent clutch mechanism acts, within the limits directed by the azimuth mode selection lever 7, to control the extent of the azimuth synchro rotor movement permitted. It thus assists in the control of the angular motion of the antenna in azimuth.

The Azimuth Cursor

An additional synchro 58 (shown in FIGS. 2, 5, 6 and 10) is permanently geared to the azimuth shaft rotation of the handle. This is used to generate the azimuth cursor. When scanning over 120 degrees, the cursor is independent of the pattern. During this mode the search mode selector has released the detent clutch and shifted pin 106 out of contact with the V-shaped notch 115. Hence, the handle 2 has no control on the search pattern in azimuth, though it may still control the cursor. During the 40-degree scan pattern, the detent clutch is engaged, and the pattern and cursor move together as the handle is shifted in azimuth. The detent clutch is designed to locate the case of the azimuth synchros so that the mechanical bias afforded by the handle position is converted to electrical bias, thus making the azimuth scan 40 degrees symmetrically about the azimuth cursor.

The azimuth cursor discussed above is non-yaw stabilized. In the event yaw stabilization of the cursor is needed, the plot will switch to the collision-track-while-scan mode of FIG. 2. This is accomplished by switching on the stabilization cursor 37, as seen in FIGS. 1 and 2. The yaw-stabilized cursor is generated by means of a differential synchro 38 which obtains its excitation from an output synchro contained in the magnetic compass 91, as seen in FIG. 2. When the operator switches on the yaw-stabilized cursor 37, the control handle 2 is no longer effective to control the cursor. The cursor will now be moved by means of the control knob 39, through which the cursor bearing desired is inserted. Orientation for the yaw-stabilized cursor is obtained by compass markings as dial indications 40 about the cursor knob. This knob controls the shaft of the differential synchro 38, also seen in FIG. 5, and so will have a one-to-one correspondence with the cursor line 100 on the pilot's indicator panel 5, seen in FIG. 18.

Since the generated cursor may represent the actual antenna (target) position in azimuth, the antenna is slewed to this azimuth position at lock-on, and the cursor thus controls the antenna azimuth with lock-on switch 35. However, since it is necessary to be able to lock-on from any of the search modes, the elevation step during double bar operation can cause the radar to lose target. Hence, at lock-on, the drive motor for the automatic search programmer is braked by switching out the alternating-current excitation and switching in the direct-current through a contact 94 forming part of switch 35 and connected to a suitable direct-current source, not shown. This will cause the antenna to remain in the chosen bar. Thus, operation of switch 35 simultaneously brakes the programmer and slaves the antenna to the cursor.

*Signal Stabilization*

Coordination of the programmed search commands and the pilot's manual control commands, which are basically inserted in the airframe coordinates, with their expression in space coordinates, including the transformations necessary to take account of the pitch, roll and yaw of the aircraft, is accomplished in an improved manner, which may be understood by considering the equations set forth hereafter and their transforms, which are in a form familiar to mathematicians.

The detailed description thus far concerns a controller for the azimuth and elevation search movements of a radar antenna, driving it with respect to the airframe. As the airframe rolls, pitches, or yaws, the antenna as described will do likewise. This is undesirable, and the antenna should be stabilized to remain at least partially independent of these airframe perturbations. In order that the radar antenna may not be disturbed by the roll of the airframe, electrical signals from the vertical gyro synchro 46A, of FIG. 2, indicating roll are added to the programmed azimuth and elevation shaft rotations 44 and 45 so that the search pattern will remain roll-stabilized in space. This addition is mechanized through the dual azimuth synchros 22A and 22B, and dual elevation synchros 14A and 14B, as seen in FIG. 2, or their equivalents 71A and 71B, and 76A and 76B, respectively, as seen in FIG. 4. Handle motion rotates the synchro stators and the programmer motor drive rotates the synchro rotors in each case. If no pitch or yaw stabilization were required, the following transformation would change the space coordinates of the azimuth and elevation inputs to interceptor coordinates against the roll of the airframe.

$$\begin{pmatrix} 0 \\ E_{az'} \\ E_{el'} \end{pmatrix} = \begin{pmatrix} 1 & 0 & 0 \\ 0 & \cos\phi & \sin\phi \\ 0 & \sin\phi & \cos\phi \end{pmatrix} \begin{pmatrix} 0 \\ E_{az} \\ E_{el} \end{pmatrix} = \begin{pmatrix} 0 \\ E_{az}\cos\phi + E_{el}\sin\phi \\ E_{el}\cos\phi - E_{az}\sin\phi \end{pmatrix} \quad (1)$$

The azimuth and elevation space coordinates are independently derived synchro type signals.

$$E_{az} = E \sin \xi_p$$
$$E_{el} = -E \sin \eta_p \quad (2)$$

The relations are represented pictorially in FIG. 19, showing the pitch, roll and yaw axes of a plane, and in FIG. 20, showing the elevation and azimuth angles of a target plane as seen from the interceptor, where:

$E_{az}$ = azimuth component of desired antenna position in space
$E_{el}$ = elevation component of desired antenna position in space
$E_{az'}$ = azimuth component of desired antenna position in airframe coordinates
$E_{el'}$ = elevation component of desired antenna position in airframe coordinates
$\xi_p$ = azimuth angular input from programmer
$\eta_p$ = elevation angular input from programmer
$\phi$ = interceptor roll angle From this, the roll-stabilized components of the position inputs can be determined.

$$E_{az'} = E \sin \xi_p \cos \phi - E \sin \eta_p \sin \phi$$
$$E_{el'} = -E \sin \eta_p \cos \phi - E \sin \xi_p \sin \phi \quad (3)$$

In the device embodying the invention, these equations are mechanized, as described above, using the programmed angles $\xi_p$ and $\eta_p$ obtained as rotations of the synchro shafts 44 and 45, FIG. 2 or 44' and 45', respectively, in FIG. 4, and the sine and cosine of the interceptor roll angle $\phi$ received as electrical signals. In the preferred embodiments, the handle motion inserted by the operator and the programmed motion continuously inserted by motor 17 are added, and the totally programmed angles inserted as antenna positioning commands are available as shaft rotations. Roll information is available on the airframe as three-phase synchro signals from the vertical gyro, as indicated at 46A. This information is converted to the sine and cosine functions by means of the passive network 47, which is a Scott-T transformer.

The manual command and programmed motions are summed by moving the stators of the appropriate synchros with the handle input, and the rotors of the same synchros with the motor driven input. The first and second azimuth synchros 22A and 22B are then employed in conjunction with first and second elevation synchros 14A and 14B, as illustrated schematically in FIG. 2, to solve the Equations 3 above. Synchros 22A and 22B (like 14A and 14B) may be two parts of a dual synchro, or two separate synchros having a common shaft input. Corresponding functions are performed by synchros 71A and 71B in the embodiment of FIG. 4 to solve the azimuth portions, and by synchros 76A and 76B to solve the elevation portions, of the Equations 3 as set forth hereafter.

Antenna position feedback information is presented in airframe coordinates for comparison with the servo inputs. The resultant error is used to correct the antenna position in search.

If the servo inputs were to be pitch-stabilized, Equations 1 and 2 would be modified as shown below:

$$\begin{pmatrix} 0 \\ E_{az'} \\ E_{el'} \end{pmatrix} = \begin{pmatrix} 1 & 0 & 0 \\ 0 & \cos\phi & \sin\phi \\ 0 & -\sin\phi & \cos\phi \end{pmatrix} \begin{pmatrix} 0 \\ E \sin \xi_p \\ E \sin(\theta - \eta_p) \end{pmatrix}$$
$$= \begin{pmatrix} 0 \\ E\cos\phi \sin \xi_p & E\sin\phi \sin(\theta-\eta_p) \\ -E\sin\xi_p \sin\phi & E\cos\phi \sin(\theta-\eta_p) \end{pmatrix} \quad (4)$$

where $\theta$ is the interceptor pitch angle. Equation 3 may then take the form:

$$E_{az'} = E \cos \phi \sin \xi_p + E \sin \phi \sin \theta \quad (5)$$
$$\cos \eta_p - E \sin \phi \cos \theta \sin \eta_p$$
$$E_{el'} = -E \sin \xi_p \sin \phi + E \cos \phi \sin \theta$$
$$\cos \eta_p - E \cos \phi \cos \theta \sin \eta_p$$

These equations can be approximated (based on small roll and pitch angles during the search mode) as follows:

$$E_{az'} \approx E \cos \phi \sin \xi_p - E \sin \phi \sin \eta_p \quad (6)$$
$$E_{el'} \approx -E \sin \xi_p \sin \phi - E \cos \phi \sin \eta_p + E \sin \theta$$

This calls for the addition of a third term to the elevation component of the input signals in airframe coordinates, which is supplied by the pitch synchro signals coming from the vertical gyro 46B, shown in FIG. 2, by means of the passive network 85. Mechanization is thus accomplished for partial interceptor pitch stabilization, by the circuitry shown in FIGS. 2, 4, and 5.

Proper functioning of the device requires that an accurate signal representing the antenna's position in azimuth in space coordinates be sent to the indicator during search:

$$\begin{pmatrix}E_r\\E_{az}\\E_{el}\end{pmatrix}=\begin{pmatrix}1 & 0 & 0\\0 & \cos\phi & -\sin\phi\\0 & \sin\phi & \cos\phi\end{pmatrix}\begin{pmatrix}\cos\xi_p & -\sin\xi_p & 0\\\sin\xi_p & \cos\xi_p & 0\\0 & 0 & 1\end{pmatrix}\begin{pmatrix}\cos\eta & 0 & \sin\eta\\0 & 1 & 0\\-\sin\eta & 0 & \cos\eta\end{pmatrix}\begin{pmatrix}E\\0\\0\end{pmatrix} \quad (7)$$

This reduces to:

$$E_{az}=E(\cos\eta\sin\xi\cos\phi+E\sin\phi\sin\eta) \quad (8)$$

The factor $E\cos\phi$ is delivered to antenna azimuth synchro 87 on a lead 89. The rotor of synchro 87 turns through the antenna azimuth angle $\xi$. Thus the output coil of the synchro 87 yields $E\cos\phi\sin\xi$, which is fed into the cosine winding of elevation resolver 80, which receives the antenna elevation angle $\xi$, to give the first term of Equation 8. The second term comes from lead 90, delivering $E\sin\phi$ into the sine winding of resolver 80 to complete Equation 8. The azimuth signal $E_{az}$ of Equation 8 is then carried by lead 81, shown on FIG. 2, to the pilot's indicator 5 for display purposes.

FIGS. 2 and 4 show schematically the arrangements of the invention which will produce shaft motions for the various synchros. As set forth above, the synchros themselves are used as summing devices to add the programmed azimuth input $\xi_p$ and programmed elevation input $\eta_p$ to the corresponding information inserted by the pilot through handle 2, that is, $\xi_p$ and $\eta_p$. This is accomplished by mounting the stators of the synchros in bearings and moving them by means of the hand, or manual control, while moving the rotors of the synchros by means of the automatic programmer, as described elsewhere.

The Equations 1 and 2 derived above were based on the assumption that no pitch or yaw stabilization was required. This derivation gave the roll-stabilized components of the position inputs to the radar antenna.

These equations have been mechanized, using the programmed angles $\xi_p$ and $\eta_p$ available as rotations from the schematic azimuth shaft 44 and the elevation shaft 45 shown in the embodiment of FIG. 2, to which shafts 44' and 45' correspond in the showing of FIG. 4. These rotations represent the addition of the handle motion and space pattern motion. Roll information is available in an electrical signal representing the angle $\phi$ from the vertical gyro synchro portion 46A mounted elsewhere in the system. It should be noted that a feature of this invention is that there is no shaft slaved to the airframe roll by a servo. A passive network 47, such as a Scott-T transformer, is used, in which the three-phase roll signal from synchro 46A is converted into a cosine and sine output on lines 49 and 50. In order to prevent the loading of the roll synchro on the vertical gyro, power amplifiers 51 and 52 are employed to isolate synchro windings 22A and 22B, or the corresponding windings 71A and 71B in the circuit of FIG. 4, from the network 47.

Azimuth cam assembly 24 and cam elevation assembly 15 operate in the embodiment of FIG. 2 to cause shafts 44 and 45 to rotate according to the programmed search pattern. These shafts are connected to synchros 22A and 22B and to synchros 14A and 14B, respectively, which comprise the dual synchros 22 and 14.

Similarly, in the schematic of FIG. 4, azimuth cam assembly 24 drives shaft 44', programming the rotors of synchros 71A and 71B. The elevation cam assembly 15' drives shaft 45', inserting programmed elevation commands in the rotors of synchros 76A and 76B.

In FIG. 2, assuming the roll synchro of the vertical gyro 46A provides a three-phase electrical signal of magnitude $E$, which varies according to aircraft roll, network 47 provides a transformation to $E\cos\phi$ and $E\sin\phi$, alternating-current voltages which are 90° out of phase with each other. These signals are then strengthened by amplifiers 51 and 52, and may be used by conventional methods (not shown) to stabilize the horizon line on the indicator through leads 54 and 55.

They are also forwarded to synchro windings 22A and 22B, respectively, where they are used to roll-stabilize the programmed azimuth signal, together with whatever manual control signal is combined therewith. These signals are also forwarded to the synchro windings 14A and 14B to roll-stabilize the programmed elevation signal, together with whatever manual control signal is combined therewith.

The roll-stabilized programmed azimuth signal from synchro 22A is received at junction point 57, where there is subtracted from it the azimuth component of the roll-stabilized programmed elevation signal. Thus the roll-stabilized azimuth signal (see Equation 3) is produced at the junction point 57 for use in the search mode to drive the antenna azimuth servo 59, which positions the antenna in azimuth, through shaft 60. Also located on shaft 60 is a resolver 61, which feeds back to the differential junction 62 to provide a closed loop control of servo 59. Differential junction 62 compares the antenna position with the drive signal received from point 57. Azimuth resolver 61 is excited by a signal $E\cos\eta$ through auxiliary elevation amplifier 63 from the elevation resolver 64. Elevation resolver 64 is driven by the elevation shaft 65 in order to extend the antenna drive pattern so that it is not rounded in the corners of its area of search. As elevation increases, the elevation signal $E$, supplied through an elevation amplifier 66, forwards a signal of greater amplitude to the elevation resolver 64 to provide a signal $E\cos\eta$ to the auxiliary elevation amplifier 63 and to the azimuth resolver 61. The azimuth resolver 61 feeds back less signal and the servo 59 is caused to sweep farther in azimuth when the antenna is elevated. In effect, the antenna sweeps in elevation in arcs of small circles of an imaginary sphere which encloses it. For additional details, reference is made to the application of Samuel Brainin entitled "Space Stabilization of a Search Pattern," filed May 10, 1954, Serial No. 428,767, now Patent No. 3,078,455, which has a common assignee with the instant application.

At junction point 73 the roll-stabilized programmed elevation signal from synchro 14B is received, and there is added into the elevation component of the roll-stabilized programmed azimuth signal from synchro 22B. This provides a roll-stabilized elevation signal (see Equation 3) to drive servo 77, which in turn drives antenna elevation shaft 65. The elevation resolver 64 which receives the constant signal $E$ and has an input from shaft 65 provides a feedback $E\sin\eta$ to differential junction 79 which accomplishes closed-loop control through servo 77 of the elevation of the antenna. Second elevation resolver 80, also driven by shaft 65, feeds back a signal through an elevation lead 81 representing the stabilized antenna position in elevation to the pilot's indicator 5, as previously described.

The indicator 5, which includes a cursor generator, not shown in detail, also receives signals for the display of the CTWS cursor or the azimuth cursor through the lead 82 from the cursor junction point 56. From junction point 56, signals are also forwarded to the azimuth differential junction 62 through lead 84 to the lock-on switch button 35 when it is in "track" position, whereby the antenna may be slaved in azimuth to the bearing of the cursor or when switch 35 is operated. As described above, during this phase, direct-current from switch contact 94 is applied to the programming motor 17 to brake it.

Pitch stabilization of the elevation servo is obtained by the use of information from the pitch angle portion 46B of the vertical gyro synchro. A sine term is obtained by a network 85, similar to network 47, and is then sent to the elevation pitch-stabilization differential junction 79. The elevation drive of the antenna is thus pitch-stabilized. The signal may also be delivered to the indicator through lead 86 to assist in stabilizing the horizon line if deemed necessary or desirable, as well known to those skilled in the art.

In order to provide indicator sweep according to the position of the antenna, synchro 87 located on the antenna azimuth drive shaft 60 receives a signal through lead 89 varying according to airframe roll as defined by $E$ cosine $\phi$ from amplifier 51 to roll-stabilize the indicator azimuth sweep voltage. Elevation resolver 80, rotated by antenna elevation shaft 65, receives the roll-stabilized indicator azimuth sweep voltage $E$ cosine $\phi$ sine $\xi$ from synchro 87 and adds it to the component of elevation appearing in azimuth as the airframe rolls, and received through lead 90, and provides this signal to the indicator 5 as $E(\cos \phi \sin \xi \cos \eta \sin \phi \sin \eta)$.

The CTWS or the azimuth cursor signal received on line 82 is a signal, previously described, that actuates a cursor generator included within the indicator 5, which gives a B-scan presentation showing range versus azimuth.

From the above description, it will be seen that the invention affords a relatively simple, rugged control system for a radar installation in an aircraft, with substantial advantage in power requirements, and freedom from maintenance difficulties associated with purely electronic systems.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a fire control system carried on an airframe and having a radar with an antenna, an armament control director, a fire control computer, a flight data computer, and a maneuverable autopilot, a radar control panel comprising means for selecting desired modes of search in azimuth and elevation; means responsive to said first mentioned means for automatically directing the antenna of said radar through a scanning mode in accordance with a selected one of said modes of search; means in cooperation with said second mentioned means for adding desired search motions of said antenna to said programmed search motions; means in cooperation with said second and third mentioned means for stabilizing the position of said radar antenna relative to that of said airframe for both transmission and reception of radar signals; means responsive to said radar and said fourth mentioned means for displaying a stabilized representation of the echoes returned by targets located during such search scanning; and means for correcting the position of said display to prevent variations due to pitch and roll motions of said aircraft.

2. In a fire control system carried by an interceptor airframe supporting a radar having a radar control panel, an indicator and associated equipment for determining and displaying the position of a target, the combination of means for receiving signals representative of the elevation and azimuth of said target relative to said interceptor; means for correcting said signals in accordance with the roll of said interceptor; means for programming elevation and azimuth antenna command signals with reference to said airframe; means adapted to be responsive to signals indicative of the angular position of an antenna relative to the airframe and cooperating with said first mentioned means for obtaining antenna control error signals representing the difference between the programmed signals and the antenna angular position signals; means for utilizing said error signals to vary the position of said antenna; single-stick pilot command means for adding pilot command signals to both said programmed elevation and azimuth signals; means for correcting said programmed and added command signals in azimuth and elevation in accordance with the pitch of said interceptor; and means comprising said last mentioned means for producing and displaying corrected and stabilized signals indicating the azimuth and elevation of said target relative to said interceptor.

3. In a fire control system carried by an interceptor having an airframe supporting a radar with an indicator and associated equipment for determining and displaying the position of a target, a radar control panel arranged to receive antenna control error signals, and having means for programming antenna elevation and azimuth command signals with reference to said airframe, said means comprising elevation and azimuth synchros having rotor and stator parts and a motor and cam mechanism for effecting relative rotation of the parts of both said synchros; pilot command means having a single handle connected to effect relative rotation of the parts of both said synchros for adding pilot command signals to both said programmed elevation and azimuth command signals; means providing an electrical signal to the synchros for stabilizing said programmed signals with reference to space coordinate; and control means for utilizing said space-stabilized command signals to vary the direction of said antenna and the position of the display on said indicator.

4. In a fire control system carried by an interceptor having an airframe supporting a radar with an indicator and associated equipment for determining and displaying the position of a target, a radar control panel arranged to receive antenna control error signals, and having means for programming antenna command signals with reference to said airframe; pilot command means having a single handle for adding pilot command signals to said programmed command signals; means for correcting said programmed command signals in accordance with the roll of said interceptor; means for stabilizing said roll-corrected programmed signals with reference to space coordinates; and control means for utilizing said space-stabilized and roll-corrected command signals to vary the direction of said antenna and the position of the display on said indicator; said radar control panel comprising a first and a second azimuth synchro stator winding, coupled together for relative rotational positioning; a first and a second elevation synchro stator winding, coupled together for relative rotational positioning; a programmer motor; azimuth and elevation cam assemblies adapted to be driven by said motor; azimuth synchro rotor windings associated rotatably with each of said azimuth synchro stator windings, said azimuth synchro rotor windings being driven through said azimuth cam assembly by said programmer motor; an elevation synchro rotor winding associated rotatably with each of said elevation synchro stator windings, said elevation synchro rotor windings being driven through said elevation cam assembly connected to said programmer motor; means for applying a signal representing the roll-corrected elevation component input to the second of said azimuth synchro stators and to the first of said elevation synchro stators; means for applying a signal representing the roll-corrected azimuth component input to the first of said azimuth synchro stators and the second of said elevation synchro stators; means for summing the output of said first azimuth synchro with programmed signals inserted by rotation of the azimuth cam assembly; means for summing the output of said first elevation synchro stator with programmed signals inserted by rotation of the elevation cam assembly; means for summing the output from said first azimuth synchro with the output of said first elevation synchro to provide a stabilized azimuth signal; means for summing the output of said second azimuth synchro with programmed signals inserted by rotation of the azimuth cam assembly; means for summing the output of said second elevation synchro with programmed signals inserted by rotation of the elevation cam assembly; means for summing the output from said second azimuth synchro with the output of said second elevation synchro to provide a stabilized elevation signal; means for comparing said stabilized azimuth signals with signals in space coordinates representng antenna position in azimuth; means for comparing said stabilized elevation signals with signals in space coordinates representing antenna position in elevation; and means for utilizing said compared signals representing antenna position in azimuth and elevation to maintain proper directions for said antenna.

5. An antenna control system comprising a first and a second azimuth synchro stator winding, coupled mechanically together for positioning; a first and a second elevation synchro stator winding, coupled mechanically together for positioning; a programmer motor; an azimuth synchro rotor winding associated rotatably with each of said azimuth synchro stator windings, said azimuth synchro rotor windings being mounted fixedly on a shaft driven by an azimuth cam assembly connected to said programmer motor; an elevation synchro rotor winding associated rotatably with each of said elevation synchro stator windings, said elevation synchro rotor windings being mounted fixedly on a shaft driven by an elevation cam assembly connected to said programmer motor; means for applying a signal representing a roll-corrected elevation component input to the second of said azimuth synchro stators and to the first of said elevation synchro stators; means for applying a signal representing a roll-corrected azimuth component input to the first of said azimuth synchro stators and the second of said elevation synchro stators; means for summing the input to said first azimuth synchro with programmed signals inserted by rotation of the azimuth cam assembly; means for summing the input to said first elevation synchro stator with programmed signals inserted by rotation of the elevation cam assembly; means for summing the output from said first azimuth synchro with the output of said first elevation synchro to provide a stabilized azimuth signal; means for summing the input to said second azimuth synchro with programmed signals inserted by rotation of the azimuth cam assembly; means for summing the input to said second elevation synchro with programmed signals inserted by rotation of the elevation cam assembly; means for summing the output from said second azimuth synchro with the output of said second elevation synchro to provide a stabilized elevation signal; control handle means for adding azimuth command signals through said shaft driven by said azimuth cam assembly; control handle means for adding elevation command signals through said shaft driven by said elevation cam assembly; means for comparing said stabilized azimuth signals with space-stabilized signals representing antenna position in azimuth; means for comparng said stabilized elevation signals with space stabilized signals representing antenna position in elevation; and means for utilizing said compared signals representing antenna position in azimuth and elevation to maintain proper directions for said antenna.

6. In combination with an aircraft having a directable antenna, an antenna control system carried by said aircraft and having a scanning mode and a tracking mode, a radar control panel having means for developing programmed antenna control signals for use in said scanning mode, and comprising a first and a second azimuth synchro stator winding coupled mechanically together for positioning; a first and a second elevation synchro stator winding coupled mechanically together for positioning; a programmer motor having three-phase windings; an azimuth synchro rotor winding associated rotatably with each of said azimuth synchro stator windings, said azimuth synchro rotor windings being mounted fixedly on a shaft driven by an azimuth cam assembly connected to said programmer motor; an elevation synchro rotor winding associated rotatably with each of said elevation synchro stator windings, said elevation synchro rotor windings being mounted fixedly on a shaft driven by an elevation cam assembly connected to said programmer motor; means for applying a signal representing a roll-corrected elevation component input to the second of said azimuth synchro stators and to the first of said elevation synchro stators; means for applying a signal representing a roll-corrected azimuth component input to the first of said azimuth synchro stators and the second of said elevation synchro stators; means for summing the input to said first azimuth synchro with programmed signals inserted by rotation of the azimuth cam assembly; means for summing the input to said first elevation synchro stator with programmed signals inserted by rotation of the elevation cam assembly; means for summing the output from said first azimuth synchro with the output of said first elevation synchro to provide a stabilized azimuth signal; means for summing the input to said second azimuth synchro with programmed signals inserted by rotation of the azimuth cam assembly; means for summing the input to said second elevation synchro with programmed signals inserted by rotation of the elevation cam assembly; means for summing the output from said second azimuth synchro with the output of said second elevation synchro to provide a stabilized elevation signal; single control handle means for adding azimuth command signals through said shaft driven by said azimuth cam assembly and for adding elevation command signals through said shaft driven by said elevation cam assembly; means for comparing said stabilized azimuth signals with space-stabilized signals representing antenna position in azimuth; means for comparing said stabilized elevation signals with space-stabilized signals representing antenna position in elevation; means for utilizing said compared signals representing antenna position in azimuth and elevation to maintain proper directions for said antenna; said control panel programming means being arranged to be ineffective in said tracking mode; means associated with said control system and effective in said tracking mode for developing signals representing the heading of said aircraft relative to a predetermined direction; means for displaying a cursor in response to said signals; means for utilizing said cursor as a guide for maintaining a desired heading of said aircraft on a collision-track-while-scan course and for cooperating with said antenna for orientation relative to said target; and means for braking said motor in the tracking mode, comprising means for applying direct current to the windings thereof.

7. In a fire control system carried by an interceptor having an airframe supporting a radar with an indicator and associated equipment for determining and displaying the position of a target, a radar control panel arranged to receive antenna control error signals, and having means for programming antenna command signals with reference to said airframe; pilot command means having a single handle for adding pilot command signals to said programmed command signals; means for correcting said programmed signals in accordance with the roll of said interceptor; means for stabilizing said roll-corrected programmed signals with reference to space coordinates; and control means for utilizing said space-stabilized and roll-corrected command signals to vary the direction of said antenna and the position of the display on said indicator; said radar control panel further comprising passive network means for correcting said antenna for pitch and roll, said control means including means for effecting movement of said antenna in a commanded scanning pattern symmetrically about the midpoint of the direction of search indicated by said pilot command means.

8. In an airborne fire control system having a radar arranged for operation in a search mode and in a tracking mode, a fire control computer, a flight data computer, and a maneuverable autopilot, a radar control panel comprising the combination of means for selecting wide and narrow scanning commanded modes of said radar antenna in azimuth in combination with selecting wide and narrow commanded vertical modes of said antenna, and means for controlling the antenna movements in the modes so selected comprising azimuth and elevation synchros having individual rotors and split stators; means for energizing said synchro stators with roll-stabilizing signals; programming motor means arranged for operation at constant speed; means for correcting said motor means to each of said rotors in synchronism to insert signals representing programmed azimuth and elevation motions of said antenna; means for rotating a first portion of said split stator of said azimuth synchro to provide a signal representing a first component of the stabilized azimuth command signals; means for rotating a second portion of said split azimuth synchro stator to provide a signal representing a second component of the stabilized azimuth command signals; means for rotating a first portion of said split stator of said elevation synchro to provide a signal representing a first component of the stabilized elevation command signal; means for rotating a second portion of said split elevation synchro stator to provide a signal representing a second component of the stabilized elevation command signal; means for combining said first azimuth and elevation components to obtain a stabilized antenna azimuth command signal; means for combining second azimuth and elevation components to obtain a stabilized antenna elevation command signal; means for utilizing said stabilized signals to control scanning motions of said antenna; means operable in the tracking mode for applying direct current to said programming motor for braking; differential synchro means adapted to have a desired course relative to magnetic compass north inserted therein, and to produce signals representing the difference between said desired course and the instantaneous heading relative to magnetic compass north; and means effective in said tracking mode for positioning said antenna in azimuth in accordance with signals from said last-mentioned differential synchro means.

9. In an airborne fire control system having a radar and an antenna therefor, a fire control computer, a flight data computer, and a maneuverable autopilot, a radar control panel comprising an electro-mechanical assembly for providing programmed traverse of the antenna in both azimuth and elevation, said assembly comprising a plurality of synchros and selectively operable motor driven cam mechanisms for driving the synchros, means connecting the synchros to the antenna for controlling the angular extent through which said antenna may be traversed in elevation and in azimuth, about a predetermined reference line relative to the vehicle carrying said system; a single control handle means disposed movably in said control panel and effective to drive the synchros to command both the elevation and azimuth of search; and means to supply additional command signals to position the radar pattern on the pilot's indicator in consonance with the direction of search commanded by the position of said control handle and by said control panel.

10. In an airborne fire control system having a radar, an armament control director, a flight data computer, and a maneuverable autopilot, a radar control panel comprising a programming motor adapted to drive azimuth and elevation programming cams continuously; a control handle adapted to insert command signals in azimuth and elevation; means for selecting desired modes of search in azimuth and elevation; azimuth synchro means having stators and rotors wherein the rotors are adapted to be continuously driven by selected ones of said azimuth programming cams; a detent clutch adapted to assist said azimuth mode selector means, said detent clutch being adapted to permit said azimuth stators to be shifted by said handle in the narrow mode only; and elevation synchro means having stators and rotors, wherein the rotors are adapted to be continuously driven by said elevation programming cam, said detent clutch being adapted to permit said elevation synchro stators to be moved by said control handle in both wide and narrow elevation modes, whereby command signals from said control handle may be added to the programmed command signals when the narrow azimuth search mode is selected, with both the wide and narrow elevation search modes.

11. In the combination substantially as described in claim 10, said detent clutch mechanism, comprising a supporting frame; a cam-positioning shaft rotatably mounted in said supporting frame; a cam mounted on said shaft and having a camming face disposed at an acute angle thereto; an axially traversable detent shaft mounted in said frame and having a pin extending therefrom normal to the axis of said shaft and an engaging pawl disposed thereon in position to be engaged by said camming face; a stub shaft disposed coaxially with said detent shaft; resilient means for urging said detent shaft axially away from said stub shaft, but to permit said detent shaft to be forced axially toward said stub shaft by rotation of said cam on said cam-positioning shaft; first gear means having a cylindrical inner shaft formed integrally therewith and extending coaxially about said stub shaft and said detent shaft; second gear means having a cylindrical outer shaft formed integrally therewith and extending coaxially about said inner shaft; a longitudinal slot formed in said cylindrical inner shaft and adapted to permit axial movement of said detent shaft pin therein; a slot formed in said cylindrical outer shaft of width varying along the axis thereof and adapted to permit restricted movement of said detent shaft pin therein, said cam-positioning shaft being adapted to traverse said detent shaft through contact with said camming face axially to permit a selective range of rotational movement of said first gear relative to said second gear.

12. The combination substantially as described in claim 10 wherein said detent clutch mechanism additionally comprises a supporting frame; a cam-positioning shaft rotatably mounted in said supporting frame; a cam mounted on said shaft and having a camming face disposed at an acute angle thereto; an axially traversable detent shaft mounted in said frame and having a pin extending therefrom normal to the axis of said shaft and an engaging pawl disposed thereon in position to be engaged by said camming face; a stub shaft disposed coaxially with said detent shaft; resilient means for urging said detent shaft axially away from said stub shaft, but to permit said detent shaft to be forced axially toward said stub shaft by rotation of said cam on said cam-positioning shaft; first gear means having a cylindrical inner shaft formed integrally therewith and extending coaxially about said stub shaft and said detent shaft; second gear means having a cylindrical outer shaft formed integrally therewith and extending coaxially about said inner shaft; a longitudinal slot formed in said cylindrical inner shaft and adapted to permit axial movement of said detent shaft pin therein; a slot formed in said cylindrical outer shaft of width varying along the axis thereof and adapted to permit restricted movement of said detent shaft pin therein, said cam-positioning shaft being adapted to traverse said detent shaft through contact with said camming face axially to permit a selective range of rotational movement of said first gear relative to said second gear; a heart-shaped cam fixedly associated with said first gear; and roller detent means rockably mounted relative to said frame on said cam-positioning shaft and arranged to center said first gear when the wide azimuth mode has been selected.

13. In an airborne radar system having an antenna movably positionable relative to the airframe of a supporting aircraft, having a pilot's indicator for visual presentation of radar echoes and having means for driving said antenna in either of four selectable scanning patterns, the method of operation which comprises receiving signals referenced to spatial coordinates and indicative of the position of a target; converting said signals to signals referenced to airframe coordinates; utilizing said signals referenced to airframe coordinates to present a stabilized target echo on said pilot's indicator; generating command signals referenced to said airframe for the control of movement of said antenna; stabilizing said command signals; comparing said stabilized command signals with said position-indicating signals; and utilizing the difference between said compared and position-indicating signals to correct the position of said antenna.

14. In a fire control system carried by an interceptor having a radar and associated equipment for displaying the position and predicting the flight of a target and computing the optimum course relative thereto of said interceptor and its armament, said radar having antenna means movably positionable relative to said interceptor by manual and programmed command signals, and means for programming command signals productive of a desired search pattern of said antenna, the method of operation which comprises combining said programmed signals with manual command signals in stabilized form; developing from said combined programmed and command signals and said antenna control error signal stabilized antenna control signals; and utilizing said stabilized signals to present a visual display of the target regardless of variations in the position of said interceptor.

15. In a fire control system to be carried by an airframe and having a radar with a pilot's display and an antenna positionable relative to said system, a fire control computer, a flight data computer, a maneuverable autopilot, and a radar control panel incorporating search programming means, the method of operation which comprises developing programmed search command signals in airframe coordinates for driving said antenna in a selectable search pattern relative to said airframe; correcting said programmed command signals for pitch and roll of said airframe; stabilizing command signals so corrected with reference to space coordinates; developing signals representing the position of said antenna in azimuth and elevation in space coordinates; comparing said stabilized command signals with said stabilized signals indicative of antenna position; developing error signals representing the differences in space coordinates between the position of said target and the commanded position of said antenna in relation thereto; utilizing said error signals to control the position of said antenna in azimuth and elevation relative to said airframe; stabilizing signals indicative of the position of said antenna so controlled; utilizing the comparison to effect a further correction in the position of said antenna relative to said airframe; and utilizing said further corrected signals to properly locate display signals presented by said radar.

16. In combinaiton with a vehicle, an antenna gimbaled on the vehicle, at least one synchro having rotor and stator parts, a servo responsive to the synchro and connected to control the orientation of the antenna relative to the vehicle, a control panel including a manual control handle connected to effect relative rotation of said synchro parts, a programming mechanism connected to effect a selected pattern of relative rotation of said synchro parts, a second control handle for changing the selected pattern of said programming mechanism, and stabilizing means including a gyroscope for providing to said synchro an antenna stabilizing electrical input, whereby orientation of the antenna relative to the vehicle is controlled according to a stabilized combination of manually directed and programmed motion.

References Cited in the file of this patent
UNITED STATES PATENTS

| | | |
|---|---|---|
| 2,414,108 | Knowles | Jan. 14, 1947 |
| 2,743,439 | Crump | Apr. 24, 1956 |